United States Patent
Gupta et al.

(10) Patent No.: US 10,430,198 B2
(45) Date of Patent: Oct. 1, 2019

(54) DYNAMIC DETECTION AND PREDICTION FOR STORE-DEPENDENT BRANCHES

(71) Applicant: Intel Corporation, Santa Clara, CA (US)

(72) Inventors: Saurabh Gupta, Karnataka (IN); Rahul Pal, Bangalore (IN); Niranjan Soundararajan, Santa Clara, CA (US); Ragavendra Natarajan, Santa Clara, CA (US); Sreenivas Subramoney, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/870,595

(22) Filed: Jan. 12, 2018

(65) Prior Publication Data
US 2019/0220284 A1 Jul. 18, 2019

(51) Int. Cl.
G06F 9/38 (2018.01)

(52) U.S. Cl.
CPC .......... *G06F 9/3844* (2013.01); *G06F 9/3806* (2013.01); *G06F 9/3859* (2013.01); *G06F 9/3861* (2013.01)

(58) Field of Classification Search
None
See application file for complete search history.

(56) References Cited

U.S. PATENT DOCUMENTS

| | | | | |
|---|---|---|---|---|
| 6,560,693 B1* | 5/2003 | Puzak | ...................... | G06F 9/383 712/205 |
| 2002/0078331 A1* | 6/2002 | Ju | ........................... | G06F 9/383 712/240 |
| 2002/0194464 A1* | 12/2002 | Henry | ................... | G06F 9/3848 712/239 |
| 2004/0078559 A1* | 4/2004 | Katayama | ............. | G06F 9/3017 712/239 |
| 2005/0235170 A1* | 10/2005 | Atkinson | .............. | G06F 1/3225 713/320 |

(Continued)

OTHER PUBLICATIONS

Sheikh, Rami, et al.: "Control-Flow Decoupling", Proceedings of the 2012 45th Annual IEEE/ACM International Symposium on Microarchitecture. IEEE Computer Society, 2012, 12 pages.

(Continued)

*Primary Examiner* — Eric Coleman
(74) *Attorney, Agent, or Firm* — Grossman, Tucker, Perreault & Pfleger, PLLC

(57) ABSTRACT

One embodiment provides an apparatus. The apparatus includes a store direct dependent (SDD) branch prediction circuitry and an SDD management circuitry. The store direct dependent (SDD) branch prediction circuitry is to store an SDD branch table. The SDD branch table is to store at least one record. Each record includes a branch instruction pointer (IP) field, a load IP field, a store IP field, a comparison info field and at least one of a store value field and/or a predicted outcome field. The SDD management circuitry is to populate the SDD branch table at runtime and to override a baseline branch prediction associated with an incoming branch IP with an SDD branch prediction, if the SDD branch table contains a first record populated with the incoming branch IP and at least one of a store value and/or an SDD predicted outcome.

24 Claims, 17 Drawing Sheets

(56) References Cited

U.S. PATENT DOCUMENTS

2010/0228957 A1* 9/2010 Rabinovitch ......... G06F 9/3806
712/238

OTHER PUBLICATIONS

Farooq, M. Umar, et al.: "Store-Load-Branch (SLB) Predictor: A Compiler Assisted Branch Prediction for Data Dependent Branches", High Performance Computer Architecture (HPCA2013), 2013 IEEE 19th International Symposium, IEEE, 2013, 12 pages.
Tyson, Gary, et al.: "Improving the Accuracy and Performance of Memory Communication Through Renaming", Microarchitecture, 1997. Proceedings, Thirtieth Annual IEEE/ACM International Symposium, IEEE, 1997, 10 pages.

* cited by examiner

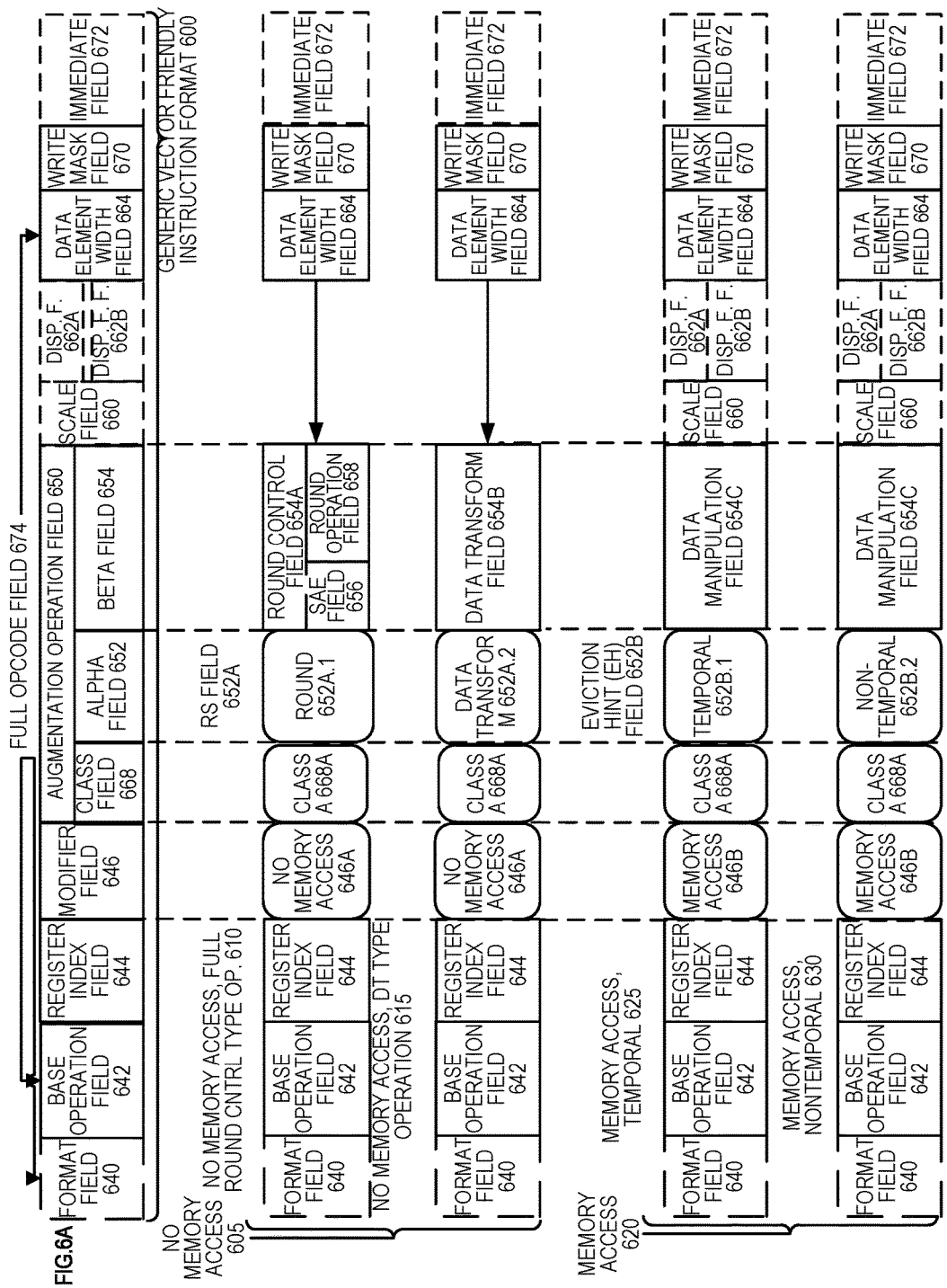

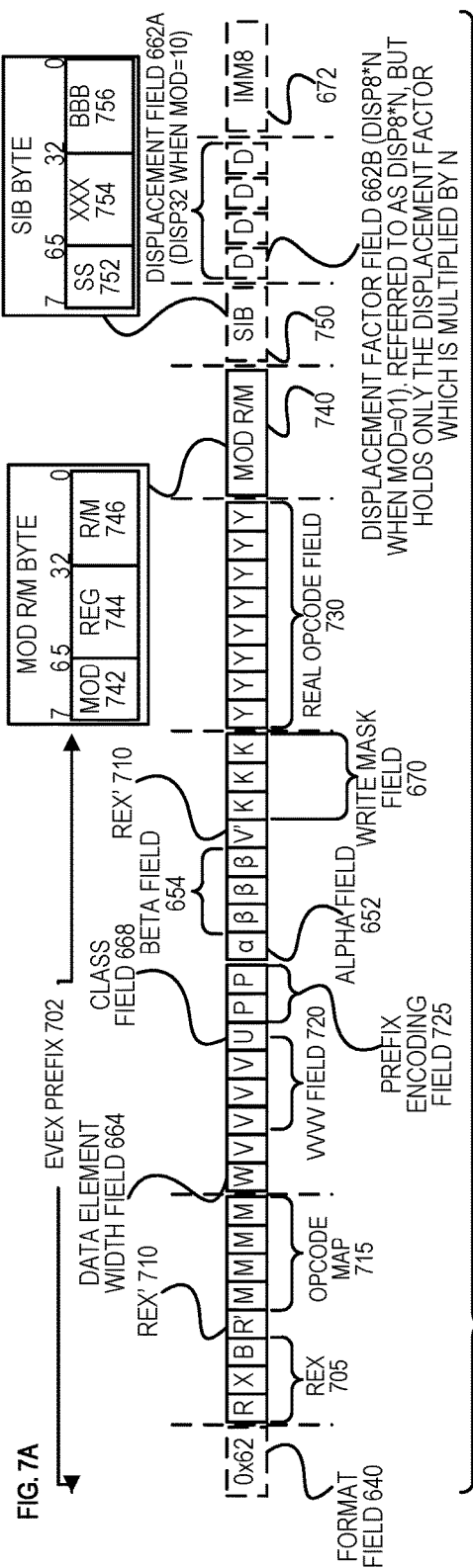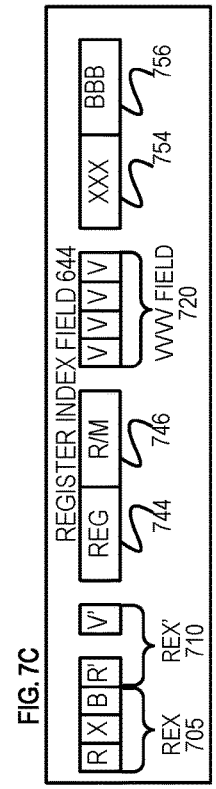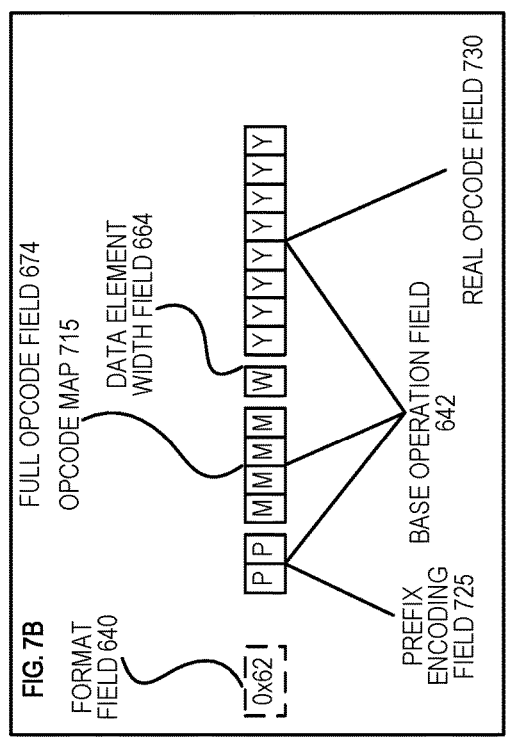

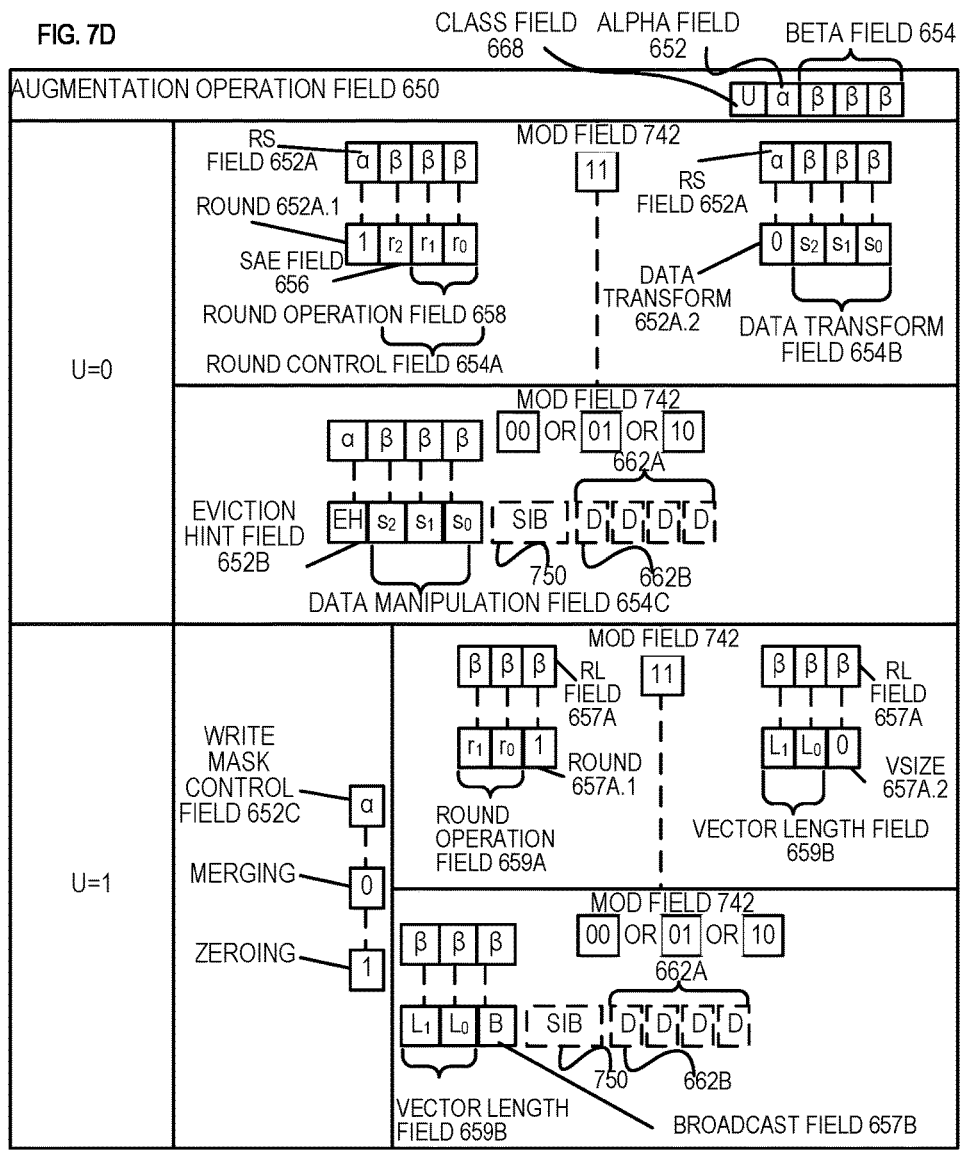

FIG. 8
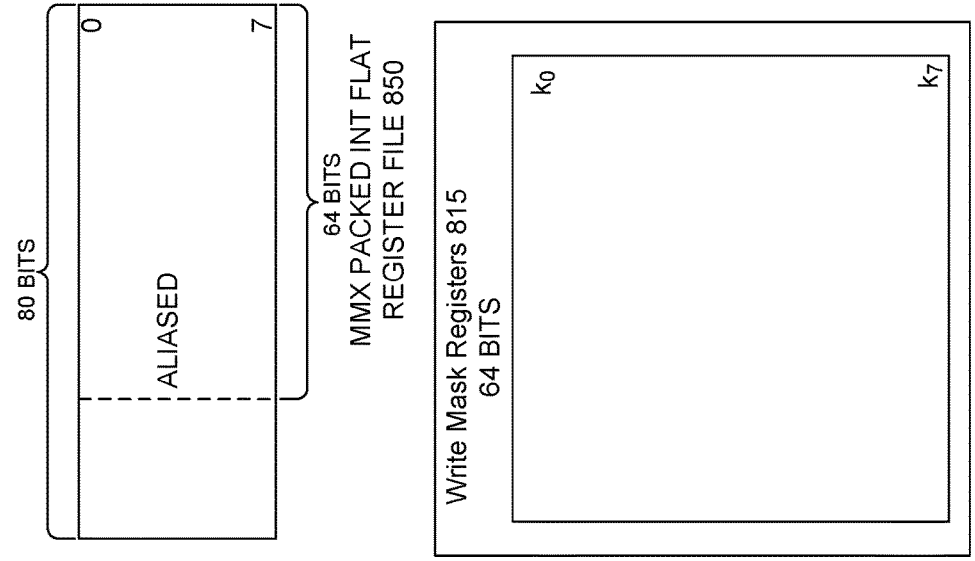
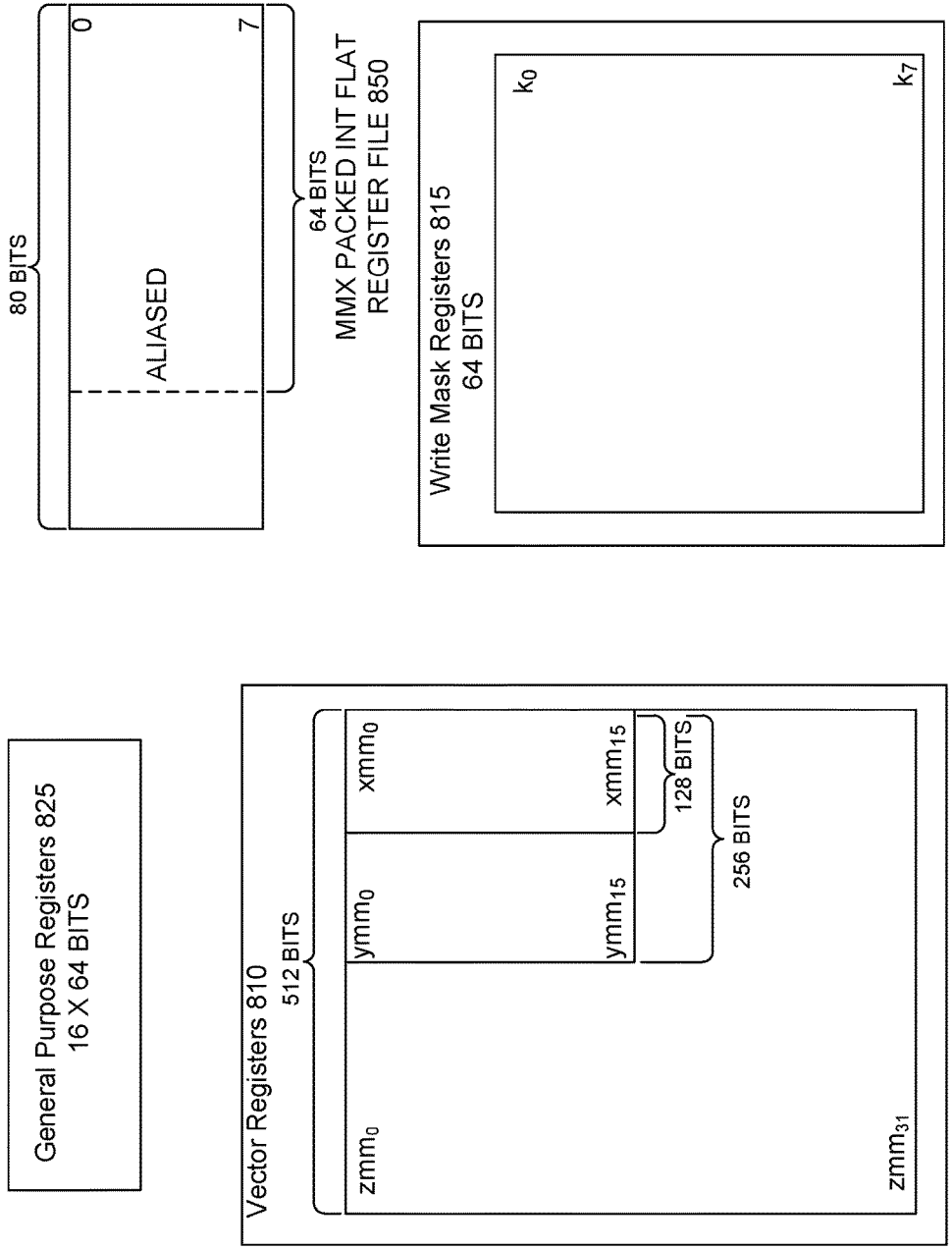

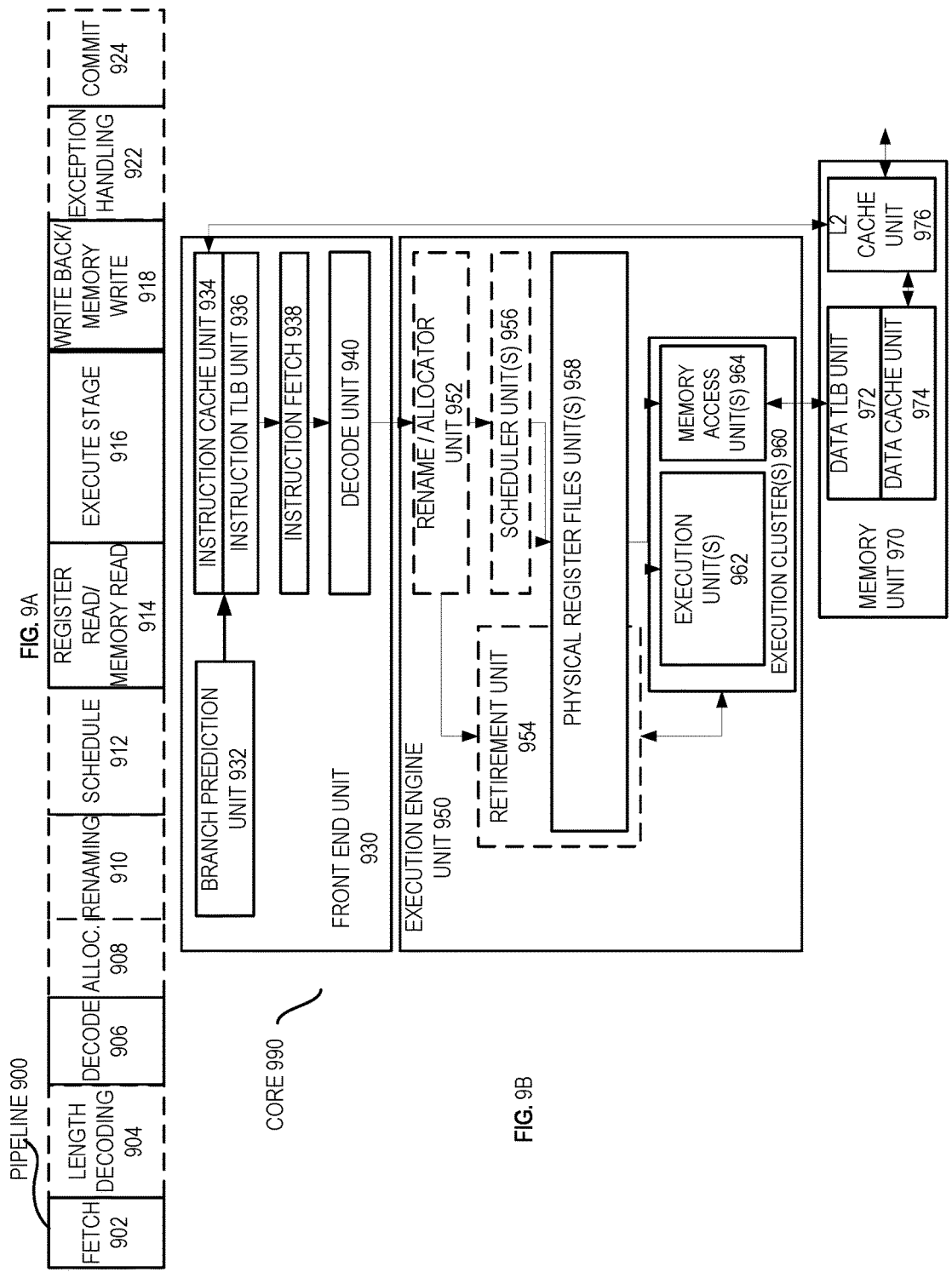

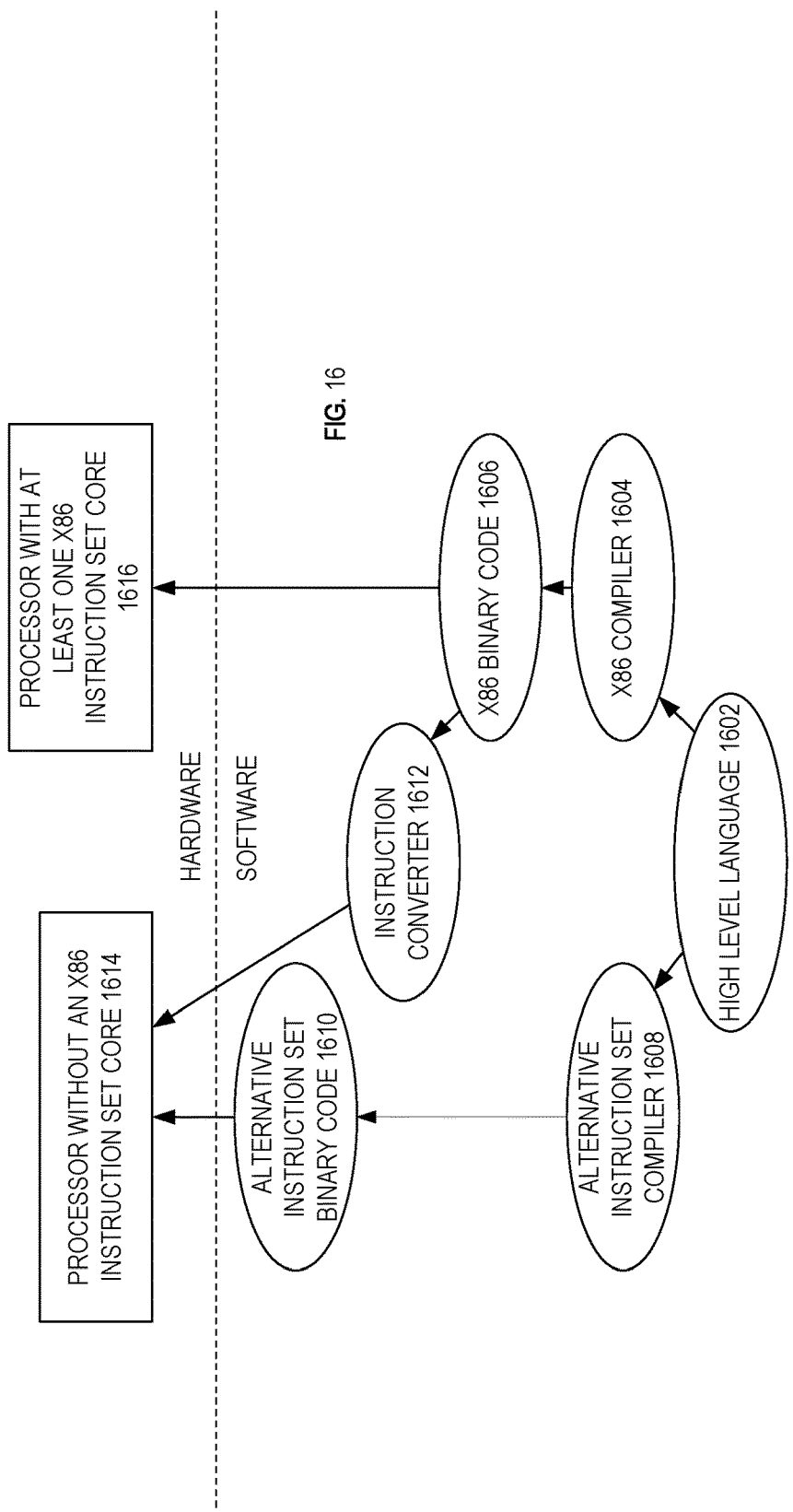

DYNAMIC DETECTION AND PREDICTION FOR STORE-DEPENDENT BRANCHES

FIELD

The present disclosure relates to store-dependent branches, in particular to, dynamic detection and prediction for store-dependent branches.

BACKGROUND

In superscalar processors configured to implement pipelining, accuracy of branch prediction can have significant impact on overall system performance. Cost of misspeculation (i.e., misprediction) increases with wider and deeper pipelines.

Generally, branch predictors rely on past behavior of a branch instruction to make a prediction of whether a branch is taken or not taken. For example, branch predictors may be configured to utilize global branch history to make the prediction. The outcome of a branch, taken or not taken, is typically determined based, at least in part, on a comparison. The outcome of the comparison and thus the branch outcome may be dependent on a result of a prior computation and/or a data value stored in memory. The result and/or data value may be obtained using a load instruction.

While predictors that rely on past behavior may capture correlation among outcomes of prior branches, some types of branches are difficult to predict using these predictors. For example, branches where a branch outcome is directly dependent on a relatively high entropy data value may be difficult to predict based on branch history since high entropy is associated with high variance.

BRIEF DESCRIPTION OF DRAWINGS

Features and advantages of the claimed subject matter will be apparent from the following detailed description of embodiments consistent therewith, which description should be considered with reference to the accompanying drawings, wherein:

FIGS. 6A-6B are block diagrams illustrating a generic vector friendly instruction format and instruction templates thereof according to embodiments of the disclosure;

FIGS. 7A-D are block diagrams illustrating an exemplary specific vector friendly instruction format according to embodiments of the disclosure;

FIG. 8 is a block diagram of a register architecture according to one embodiment of the disclosure;

FIG. 9A is a block diagram illustrating both an exemplary in-order pipeline and an exemplary register renaming, out-of-order issue/execution pipeline according to embodiments of the disclosure.

FIG. 9B is a block diagram illustrating both an exemplary embodiment of an in-order architecture core and an exemplary register renaming, out-of-order issue/execution architecture core to be included in a processor according to embodiments of the disclosure;

FIG. 16 is a block diagram contrasting the use of a software instruction converter to convert binary instructions in a source instruction set to binary instructions in a target instruction set according to embodiments of the disclosure.

Figure 1:
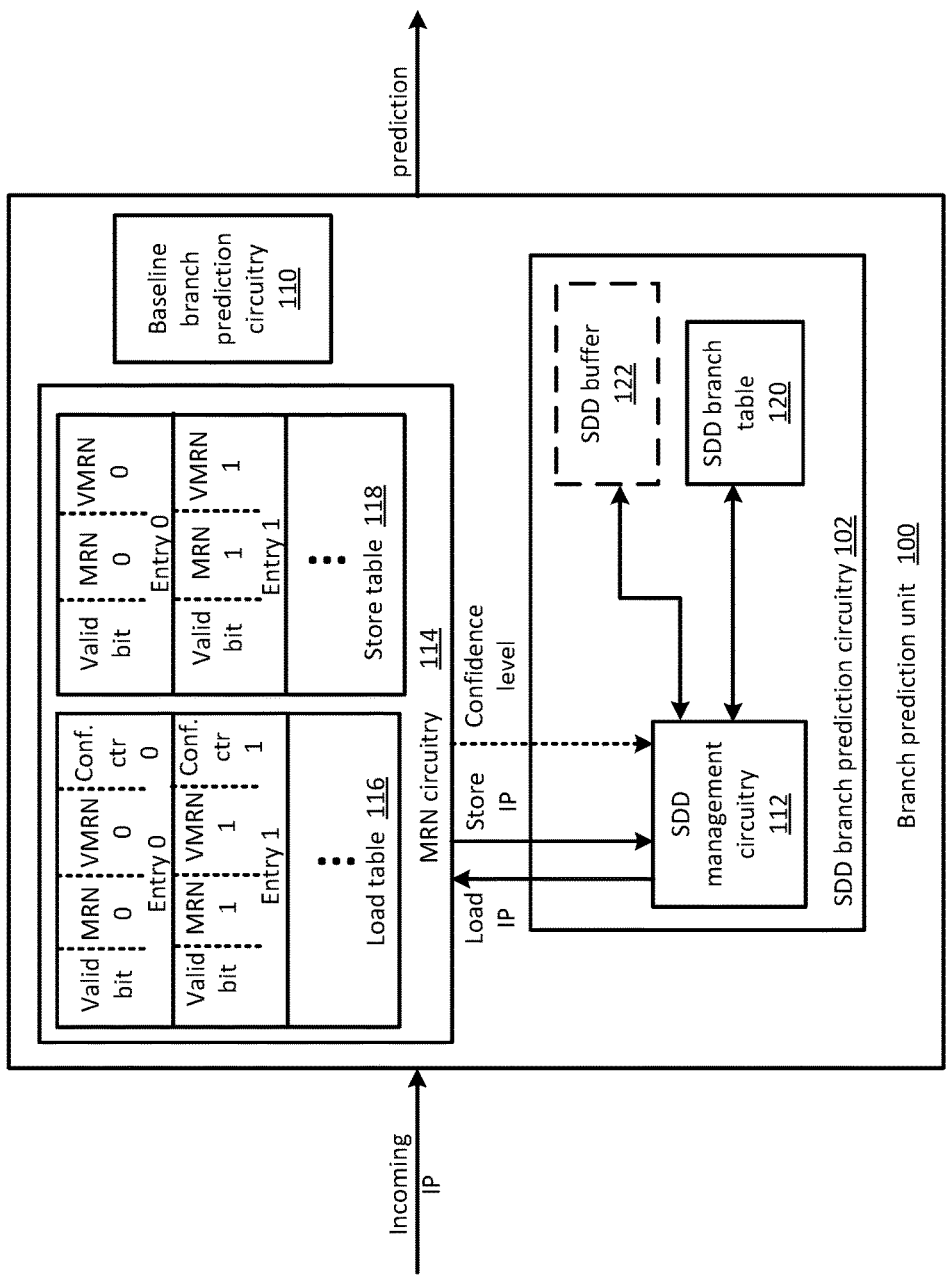
FIG. 1 illustrates a functional block diagram of a branch prediction unit that includes a store direct dependent (SDD) branch prediction circuitry consistent with several embodiments of the present disclosure.

Although the following Detailed Description will proceed with reference being made to illustrative embodiments, many alternatives, modifications, and variations thereof will be apparent to those skilled in the art.

DETAILED DESCRIPTION

Store direct dependent (SDD) branches are conditional branches where a branch outcome (i.e., taken/not taken) is directly dependent on a data value ("load value") stored in a memory location. The branch outcome is determined based, at least in part, on a comparison between the load value and another value. Thus, the load value governs the outcome of the branch. Generally, a branch instruction and associated load instruction may be relatively near each other in a sequence of instructions in a program code. Thus, the data value fetched (i.e., loaded) by the load instruction may generally not be available before the branch outcome is predicted.

Table 1 illustrates one example pseudocode (and corresponding assembly language instructions) that includes an SDD branch instruction. The data stored at the memory location A[i] may be relatively high entropy, as described herein.

TABLE 1

| | |
|---|---|
| A[i] = computation; | movl %ebx,0x868(%rdx) - Store to A (st) |
| ... | ... |
| ... | ... |
| | movl 0x868(%rdx),%eax - Load from A (ld) |
| if(A[i] == 1) | cmpl $0x1,%eax - compare |
| do work | je 0xfffa01596d1 |

The instruction "A[i]=computation" corresponds to a store instruction (st) where a result of the computation is stored to memory location A. The instruction "if(A[i]==1)" includes a load instruction (ld) that loads the data value previously stored to memory location A into a register. The "if(A[i]==1)" instruction further includes a comparison between the load value and another value (equal to one, in this example). The branch outcome, i.e., whether the branch is taken or not taken, depends on a result of the comparison, i.e., whether the condition if(A[i]==1) is true or not. Whether the condition is true or not depends on the value (i.e., the load value) of A[i]. If A[i] is relatively high entropy, reliably predicting the branch outcome based on history may be problematic.

Generally, this disclosure relates to dynamic detection and prediction for SDD branches. An apparatus, method and/or system are configured to override a baseline branch prediction associated with an incoming branch IP (Instruction Pointer), if an SDD branch table contains a record populated with the incoming branch IP and at least one of a store value and/or an SDD predicted outcome. The baseline branch prediction may then be overridden with an SDD branch prediction that corresponds to the SDD predicted outcome.

The SDD branch table is configured to store at least one record and may be populated at runtime. Each record may contain a branch IP field, a load IP field, a store IP field, a comparison info field and at least one of a store value field and/or a predicted outcome field. The branch IP field is configured to store the branch IP of the branch instruction whose outcome is to be predicted. The load IP field is configured to store a load IP of a load instruction configured to load a data value (load value) from memory into a register for a comparison that determines a branch outcome. The store IP field is configured to store a store IP of a store instruction configured to store the data value to memory. The comparison info field is configured to store one or more of a compare value, an indication whether a compare operation is between a store value and a compare value or between two store values and/or a compare condition. The store value field is configured to store a store value associated with a store instruction that corresponds to the store IP. The store value may be captured upon dispatch of the store instruction. The predicted outcome field is configured to store a predicted outcome or a pointer to a first in first out (FIFO) queue. The FIFO queue is configured to store a plurality of SDD predicted outcomes associated with a respective one branch IP.

The load IP of a load instruction may be determined based, at least in part, on a sequence of instructions preceding an SDD branch instruction. For example, the load instruction may be configured to load a load value into a register and may be related to a compare instruction that precedes the branch instruction in the sequence of instructions. The load value is configured to govern the branch outcome, i.e., the branch outcome depends on the load value.

The store IP may be determined based, at least in part, on the load IP using a memory renaming (MRN) technique. For example, an MRN circuitry may be queried using the load IP to identify a corresponding store IP.

Memory renaming is a technique in which store/load pairs directed to the same memory address are mapped to a same physical register. MRN techniques attempt to ensure that the data copied to a physical register by a store operation is available from the physical register by a subsequent load operation (as opposed to requiring the load operation to retrieve the same data from memory, which would significantly increase latency). In one nonlimiting example, both memory rename (MRN) registers and virtual memory rename registers (VMRN) may be utilized to track store/load mappings using components within a decode and/or execution stage of a processor.

Thus, an apparatus, method and/or system are configured to detect and/or identify each SDD branch that can be predicted if the data value of an associated prior load, i.e., store value, can be supplied. A corresponding record in the SDD branch table may then be populated. Each SDD branch instruction and SDD branch record in the SDD branch table may be identified by a corresponding branch IP. At prediction, when an incoming IP matches a branch IP included in the SDD branch table, the prediction may be retrieved from the SDD branch table record for the branch instruction (identified by the branch IP). The SDD prediction may then override, i.e., replace, a corresponding baseline prediction.

An SDD branch instruction may be detected and a branch outcome may be predicted independent of a corresponding instruction set architecture (ISA) and without specific compiler support. Thus, SDD branch prediction, as described herein, may operate with legacy program code without recompilation. A dependence of a branch outcome on a prior store and load may be detected dynamically at runtime. Thus, MPKI (Mispredictions Per Kilo Instructions) may be reduced by accurately predicting a branch outcome of at least some SDD branch instructions, as described herein.

Identifying a store IP and capturing a corresponding store value rather than using the load value may result in an increase in a slack (time window) between availability of the data value and the branch prediction since the store occurs prior to the load in an instruction sequence. Thus, branch prediction for store direct dependent branch instructions may be facilitated.

FIG. 1 illustrates a functional block diagram of a branch prediction unit 100 that includes a store direct dependent (SDD) branch prediction circuitry 102 consistent with several embodiments of the present disclosure. Branch prediction unit 100 is one example of branch prediction unit 932 of FIG. 9B, as described herein. Branch prediction unit 100 includes baseline branch prediction circuitry 110 and MRN circuitry 114. In an embodiment, branch prediction unit 100 may include SDD branch prediction circuitry 102. In another embodiment, SDD branch prediction circuitry 102 may be coupled to branch prediction unit 100.

Branch prediction unit 100 is configured to receive an incoming instruction pointer (IP) and to provide a prediction as output. The incoming IP may correspond to a branch instruction and the prediction is configured to indicate taken or not taken (i.e., branch outcome) with respect to the branch instruction. The baseline branch prediction circuitry 110 is configured to perform branch prediction operations using, for example, global branch history to make a baseline branch prediction. If not overridden with an SDD branch prediction, as described herein, the output prediction is configured to be the baseline branch prediction.

MRN circuitry 114 is configured to identify a relationship between a load instruction and a previous store instruction that generated the data to be retrieved by the load instruction. For example, MRN circuitry 114 may include a load table 116 and a store table 118. Each entry, e.g., Entry 0, in the load table 116 has a valid bit to indicate whether the corresponding entry is valid, a MRNi register field to identify a memory rename register, a VMRNi field to identify a current virtual rename register, and a confidence counter field containing a confidence counter value, e.g., Conf. ctr 0. Each entry, e.g., Entry 0, in the store table 118 includes a valid bit to indicate whether the entry is valid, a MRNi register field to identify a memory rename register, and a VMRNi field to identify a current virtual rename register.

In one nonlimiting example, MRN circuitry 114 may be configured to receive three types of notifications from, for example, a memory execution unit (MEU) configured to train MRN circuitry 114. Generally, an MEU may be configured to perform memory access operations including, for example, load and or store operations. In one nonlimiting example, the MEU may correspond to memory access unit 964 of FIG. 9B, as described herein. In response, MRN circuitry 114 is configured to update its tables: allocate store-load pair; promote a load; and demote a load. An Allocate event trains MRN circuitry 114 with a new store-load pair. In response, MRN circuitry 114 assigns a MRN register for the pair. In one embodiment, if the store already has an assigned MRN register (e.g., indicated within the store table 118) and the load does not, the MRN register identity is copied to the load (e.g., to the load table 116). If the load has an assigned MRN register and the store does not, the register is copied to the store. In one embodiment, the load's confidence counter is initially set to 0 for Allocate events.

In one nonlimiting example, the MEU may be configured to notify MRN circuitry 114 of each load for which verification has succeeded using a promote event (i.e., each load for which the stored data was successfully accessed from a MRN/VMRN register). In response to the Promote event, MRN circuitry 114 is configured to increment its confidence counter value. In one nonlimiting example, the MEU is configured to notify MRN circuitry 114 of each load for which verification has failed using a Demote event (i.e., each load for which the stored data was not successfully accessed from a MRN/VMRN register). In another nonlimiting example, the confidence counter may be zeroed out in response to a Demote event. Thus, the confidence counter value provides an indication of the strength of the MRN/VMRN mapping. The confidence counter values may be used by, e.g., SDD branch prediction circuitry 102, to determine whether to override a baseline branch prediction with an SDD branch prediction, as described herein.

SDD branch prediction circuitry 102 includes SDD management circuitry 112 and SDD branch table 120. In some embodiments, SDD branch prediction circuitry 102 may include SDD buffer 122, as described herein. SDD management circuitry 112 is configured to provide a load IP associated with a branch instruction to MRN circuitry 114. MRN circuitry 114 may then be configured to provide a corresponding store IP, if any, to SDD management circuitry 112. In some embodiments, MRN circuitry 114 may be further configured to provide a confidence level (e.g., confidence counter value) associated with the store IP to SDD management circuitry 112.

SDD management circuitry 112 is configured to capture an incoming branch IP. For example, the incoming branch IP may be provided to or captured by the branch prediction unit 100 and/or baseline branch prediction circuitry 110. SDD management circuitry 112 is configured to identify a register, R, in a compare instruction that precedes the branch instruction associated with the incoming branch IP and that governs the branch outcome. SDD management circuitry 112 is further configured to determine whether a prior instruction is a load into register, R.

In one embodiment, SDD management circuitry 112 may be configured to maintain a window of a number, N, past (i.e., previously seen) instructions. The N past instructions may include a sequence of instructions with a most recent instruction corresponding to the Nth instruction. For example, the window of N past instructions may be maintained in SDD buffer 122. In another example, the window of N past instructions may be maintained in another structure. For example, the structures may include, but are not limited to, a, reorder buffer, a reservation station, etc. In one nonlimiting example, N may be 20. In another example, N may be greater than 20 or less than 20. SDD management circuitry 112 may then be configured to determine whether the register, R, corresponds to (e.g., is matched with) a past instruction's destination register. If the first matching instruction is a load instruction (destination of load instruction is R), the branch instruction may be identified as an SDD branch instruction. SDD management circuitry 112 may be configured to search the window of past instructions, beginning with the instruction preceding the branch instruction, until a load is encountered.

If, during the search, an instruction is identified that modifies register R, between a load instruction and the compare instruction then the search may be halted (i.e., the load value is killed by another instruction). The branch instruction may then not be classified as an SDD branch instruction. For example, a value may be loaded into the register, R, and, prior to the branch instruction configured to utilize the value loaded in register, R, the value may be modified. As a result, a prior store value that corresponds to the load value may not match the contents of the register, R, and thus may not be used to predict the branch outcome. In other words, the load value may not be known until after the contents of the register, R, are modified.

If the incoming branch instruction is identified as an SDD branch instruction, the incoming branch IP and test condition (e.g., immediate value, if any, and the type of comparison) of the prior compare instruction may be stored in the SDD branch table 120. For example, SDD management circuitry 112 may be configured to capture the branch IP and the test condition information for storage in the SDD branch table 120, as described herein.

The compare instruction may be configured to compare the register and one immediate operand, the register and a memory location or two registers. If the compare instruction is configured to compare the register and one immediate operand, then SDD management circuitry 112 may be configured to determine whether the register is associated with a past instruction's destination, i.e., a store instruction. If the compare instruction is configured to compare the register and a memory location or two registers, then SDD management circuitry 112 may be configured to determine whether the two registers or the register and the memory location are each associated with a respective past instruction's destination. A corresponding record in the SDD branch table 120 may then include a second load field IP and a corresponding second store IP associated with the branch IP. The second load IP field and second store IP field may then correspond to the second register operand. The SDD management circuitry 112 may then be configured to identify load IPs for load instructions associated with both register operands such that each loaded value is not modified prior to the compare instruction. Thus, a relatively greater number of branch instructions may be classified as SDD branch instructions facilitating a relatively larger reduction in misprediction.

In another example, for a compare instruction configured to compare an immediate value with a value stored at a memory location (e.g. cmp $10, 0x8(% r1)), the branch may be directly qualified as an SDD branch.

Once the load IP associated with the SDD branch instruction has been determined, MRN circuitry 114 may be queried to identify the corresponding store instruction that writes to a same memory location. For example, SDD management circuitry 112 may be configured to provide the load IP to MRN circuitry 114. If MRN circuitry 114 has a confident store-load pair available for the load IP, the corresponding store IP may be retrieved from MRN circuitry 114. SDD branch table 120 may then be populated with the load IP, store IP and at least some comparison info. For example, the comparison info may include a compare value, an indication whether a compare operation is between a store value and the compare value or between two store values and/or a compare condition. If MRN circuitry 114 does not have a confident store-load pair available for the load IP, then the branch IP may not be classified as an SDD branch IP. For example, a record in SDD table 120 may not be populated with the branch IP, load IP, etc. The baseline prediction may then not be over ridden.

In an embodiment, a confidence level, e.g., confidence counter values, may be used by, e.g., SDD management circuitry 112, to determine whether to override a baseline branch prediction with an SDD branch prediction. For example, if the confidence counter value is greater than or equal to a threshold, the baseline branch prediction may be overridden with the SDD branch prediction. In other words, a store value and/or an SDD predicted outcome may be stored in an SDD branch table, as described herein. In another example, if the confidence counter value is less than the threshold, the baseline branch prediction may not be overridden. An example of confidence counter scheme is to use a counter that counts between 0 and N. A correct prediction given by an SDD branch table entry may increase the counter value and an incorrect prediction may decrease the counter value. In one nonlimiting example, the threshold value may correspond to N−1 or N−2. In one nonlimiting example, N may be eight corresponding to a 3 bit counter. Other values of N may be used, within the scope of the present disclosure.

Thus, a record in SDD branch table 120 may (or may not) be populated, at runtime, based, at least in part, on an incoming branch IP.

Figure 2:
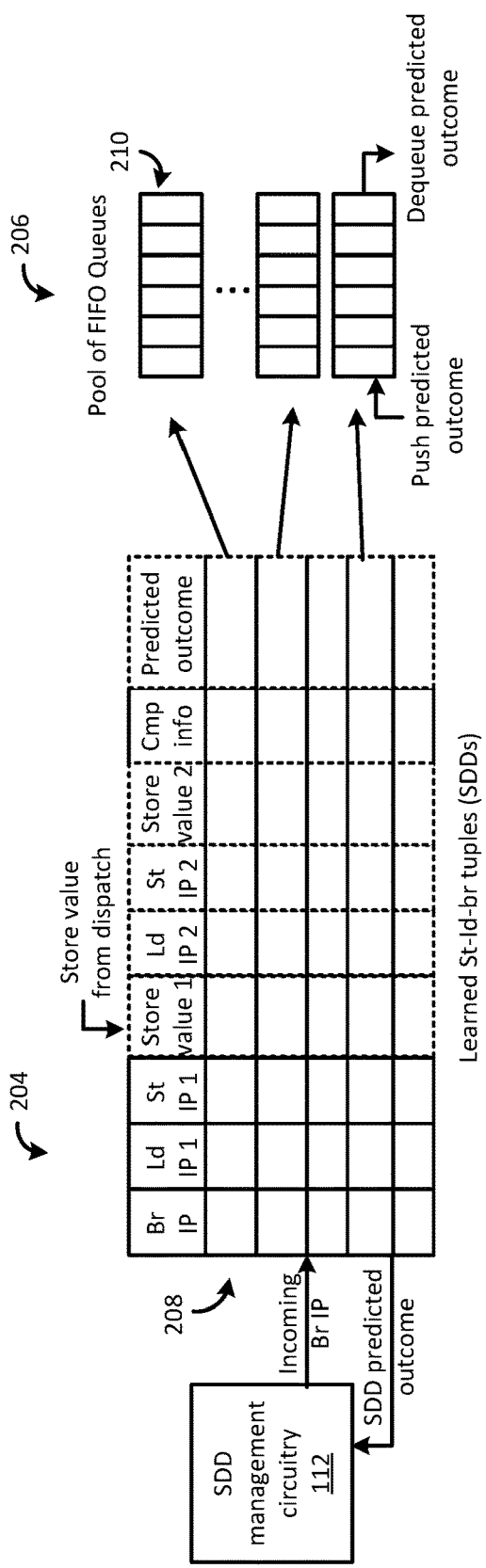
FIG. 2 illustrates a SDD branch table according to at least one embodiment of the present disclosure.

FIG. 2 illustrates a SDD branch table 204 according to at least one embodiment of the present disclosure. SDD branch table 204 is one example of SDD branch table 120 of FIG. 1. SDD branch table 204 is configured to be populated and queried by SDD management circuitry 112. SDD branch table 204 is configured to store at least one record, e.g., record 208. Each record corresponds to a learned store-load-branch (st-ld-br) tuple for a corresponding SDD branch instruction. Each record includes a plurality of fields. Each field is configured to store a corresponding value. The fields may include a branch IP (Br IP) field, a first load IP (Ld IP 1) field, a first store IP (St IP 1) field and a comparison info (Cmp Info) field. Each record in SDD branch table 204 may include a first store value (store value 1) field and/or a predicted outcome (Predicted outcome) field. In some embodiments, a selected record may further include a second load IP (Ld IP 2) field and a second store IP (St IP 2) field. In these embodiments, a selected record may include a second store value (Store value 2) field. In some embodiments, SDD branch table 204 may include one or more first in, first out (FIFO) queues.

For example, the store value 1 field may contain a pointer to a FIFO queue configured to store a plurality of store values corresponding to the first store IP. In this example, the store IP 1 may be included in a loop that generates a plurality of store values. The store value 2 field, if present, may similarly contain a pointer to a FIFO queue.

In another example, the predicted outcome field may contain a pointer to a FIFO queue configured to store a plurality of predicted outcomes. In this example, the store IP 1 may be included in a loop that generates a plurality of store values and the corresponding plurality of predicted outcomes.

The first load IP corresponds to the IP of a first load instruction where an outcome of the branch instruction corresponding to the branch IP depends on the value loaded by the first load instruction. The first store IP is the IP of a first store instruction that stored the first value subsequently loaded by the first load instruction. The second load IP corresponds to the IP of a second load instruction where an outcome of the branch instruction corresponding to the branch IP depends on the value loaded by the second load instruction. The second store IP is the IP of a second store instruction that stored the second value subsequently loaded by the second load instruction. The second load instruction corresponds to the second load IP. Whether the second load IP, the second store IP and the second store value are present for a selected record depends on whether the comparison associated with the branch instruction corresponding to the branch IP is between a register value and an immediate value or between a first register value and a second register value (or a value stored in memory).

Comparison info may include the value to compare (for example, if the comparison is between the first store value and an immediate value) and includes the type of comparison to be used to determine Predicted outcome from the first store value. The type of comparison may include, but is not limited to, greater than, less than, greater than or equal to, less than or equal to, equal to, not equal to, etc.

Predicted outcome field may include either a predicted outcome or a pointer to a FIFO queue assigned to a selected St-ld-br tuple. The predicted outcome field may include the predicted outcome of a comparison for a branch instruction that is not in a loop. The predicted outcome field may include a pointer to a FIFO queue if a corresponding first load instruction and a corresponding first store instruction are each included in respective loops. In other words, branch instructions included in a loop may execute a number of times but the branch IP associated with the branch instruction is the same for each pass through the loop. Thus, one branch IP may be associated with a plurality of load IP/store IP pairs and a plurality of predicted outcomes. In one nonlimiting example, a first loop may include a store instruction and a second loop may include a corresponding load instruction. A plurality of stores may be dispatched and a plurality of corresponding predictions determined prior to a prediction being consumed in a load operation. SDD management circuitry 112 is configured to assign a FIFO queue to a branch IP if, for a same branch IP (i.e., same SDD branch table record), a subsequent store is dispatched to update the store value before the corresponding prior prediction is consumed, as described herein. The first loop may complete before the second loop starts. Thus, a plurality of predicted outcomes may be pushed to a corresponding FIFO queue, e.g., FIFO queue 210, of the pool 206 of FIFO queues. Table 2, described below, is one possible example scenario where a subsequent store is dispatched to update the store value before the corresponding prior prediction is consumed.

Thus, SDD branch table 204 may be populated by SDD management circuitry 112 and may thus store a plurality of records, e.g., record 208, relating a branch IP, at least one load IP, at least one store IP and a predicted outcome or pointer to a corresponding FIFO queue. Each record may further include comparison info. In some embodiments, each record may include a store value.

A program code portion (i.e., sequence of instructions) that includes a branch instruction may be static or dynamic. A dynamic program code portion may be modified on the fly, i.e., during execution. A static program code portion, on the other hand, may not be modified during execution. For dynamic code regions, operations associated with populating the SDD branch table 204 may be performed each time a branch instruction IP is identified whether or not the corresponding branch IP is included in the SDD branch table 204. For static code regions, operations associated with populating the SDD branch table 204 (e.g., branch IP, load IP, store IP, comparison info) may initially be performed once for each branch IP. In other words, for static code regions, the operations may be performed on an SDD branch table miss and may not be performed on an SDD branch table hit.

Turning again to FIG. 1, when a store instruction is dispatched, SDD management circuitry 112 is configured to determine whether SDD branch table 120 (e.g., a record included in SDD branch table 120) includes a corresponding store IP that matches an IP of the dispatched store instruction. The store IP may have been previously provided by, e.g., MRN circuitry 114, as described herein. If the SDD branch table 120 includes the corresponding store IP, SDD management circuitry 112 is configured to capture the stored data associated with the dispatched store instruction. SDD management circuitry 112 may then be configured to perform the comparison indicated by Cmp info and store the associated prediction (taken/not taken) in the corresponding record in the SDD branch table 120. In some situations, the store value may be stored in the corresponding record in the SDD branch table 120, as described herein.

In some situations, a store value from a store dispatch may not be consumed by a corresponding load operation before another dynamic instance of the store IP produces a next store value. Table 2 illustrates one such example where a first loop (for (i) { . . . }) contains a plurality of store instructions (A[i]=result) and a second loop (for (j) { . . . }), that follows the first loop, contains a plurality of load instructions (int x=A[j]) and a corresponding plurality of branch instructions (if(x==1) . . . ).

TABLE 2

```
for(i)
{
...
result = some computation;
A[i] = result; //store
...
}
...
for (j)
{
int x = A[j]; //load
if(x == 1) //branch
do work
}
```

The plurality of load instructions is configured to consume the plurality of store values stored by the first loop. In other words, in this example, a plurality of stores are dispatched before predictions associated with the store values are consumed by the branch instructions. In an embodiment, SDD management circuitry 112 is configured to store the predictions based on the dispatch store values of the first loop in a FIFO queue, for example, FIFO queue 210 of the pool 206 of FIFO queues of FIG. 2. SDD management circuitry 112 is configured to detect whether or not a store value produced by a store dispatch is consumed by a corresponding load instruction before another dynamic instance of the store IP produces a next store value. For example, if the same SDD branch table record receives another store dispatched configured to update the store value in the SDD branch table before the prediction is consumed, the SDD branch table record is assigned a FIFO queue, e.g., FIFO queue 210, from the pool 206 of FIFO queues. In this manner, the predictions may be determined based on the associated compare condition and pushed into the FIFO queue. The predicted outcome may then be popped from the FIFO queue at prediction time in the FIFO order.

SDD management circuitry 112 is configured to determine, i.e., generate, a prediction (i.e., predicted outcome) based, at least in part on a store value and based, at least in part on comparison information, Cmp info. In an embodiment, a predicted outcome may be determined when the store value is available. SDD management circuitry 112 may be configured to query the Cmp info field and to perform the comparison indicated by the Cmp info field. A result of the comparison may then correspond to the Predicted outcome. The SDD management circuitry 112 may then be configured to store the predicted outcome to the SDD branch table or to push the predicted outcome into the FIFO queue, as described herein. In one example, determining the predicted outcome may include comparing, e.g., subtracting, the store value from a compare value included in cmp info field. In another example, determining the predicted outcome may include comparing a first store value and a second store value included in a same branch IP record in the SDD branch table 120. The Cmp info field may contain an indication whether the comparing is between a store value and a compare value or between two store values. The Cmp info field may contain a compare condition (e.g., jump when equals, jump when greater than, etc.) that corresponds to a taken or not-taken prediction that is based on the result of the compare.

Thus, the SDD branch table 120 may be populated.

Once the SDD branch table 120 is populated with at least one record, SDD management circuitry 112 is configured to capture an incoming branch IP that may be received by branch prediction unit 100. SDD management circuitry 112 may then be configured to query the SDD branch table 120 to determine whether the incoming branch IP corresponds to, i.e. matches, a stored branch IP. If the incoming branch IP does not match a stored branch IP (i.e., a miss), then a baseline predicted outcome provided by baseline branch prediction circuitry 110 may be provided as the prediction output from branch prediction unit 100. In other words, the baseline branch prediction may not be overridden.

If the incoming branch IP matches a stored branch IP (i.e., a hit and a predicted outcome exists), the corresponding predicted outcome may then be retrieved. In one example, the corresponding predicted outcome may be directly retrieved from the predicted outcome field of the SDD branch table 120. The predicted outcome in the corresponding SDD branch table record may then be cleared while the Store-load-branch IP tuple may be maintained in the SDD branch table 120. In other words, there is producer-consumer relationship between the store and the load/compare/branch instruction. Once the value produced by store (held in the SDD table 120 after store dispatch) is consumed for branch prediction, predicted outcome may then be cleared. If the store value is always consumed by the prediction before it is overwritten by another store instruction, there is no need for FIFO queue for that particular SDD table entry. Otherwise, the presence of the predicted outcome indicates that the branch has not yet consumed the store value and triggers the use of the FIFO queues.

In another example, if the predicted outcome field contains a pointer to a corresponding FIFO queue, the corresponding predicted outcome may be popped from the corresponding FIFO queue.

SDD management circuitry 112 may then be configured to override a baseline branch prediction associated with the incoming branch IP. For example, the baseline branch prediction may be provided by baseline branch prediction circuitry 110. The retrieved predicted outcome may then be provided as a prediction output from branch prediction unit 100.

Turning again to FIG. 2, the SDD branch table 204 is configured to contain a predicted outcome or a pointer to a FIFO queue of predicted outcomes for each branch IP record, e.g., branch IP record 208. In another embodiment, the SDD branch table 204 may be configured to store respective store values in the FIFO queues and SDD branch table. In these embodiments, the prediction may then be determined when the branch is encountered. An amount of time associated with the prediction operations may be relatively longer at the prediction time in the front end compared to the embodiment where the predicted outcome(s) is/are stored. In this embodiment, the SDD branch table 204 may occupy relatively more storage compared to the embodiment where one bit corresponding to T/NT prediction is stored.

Thus, an apparatus, method and/or system are configured to override a baseline branch prediction associated with an incoming branch IP, if an SDD branch table contains a record populated with the incoming branch IP and at least one of a store value and/or an SDD predicted outcome. The baseline prediction may then be overridden with an SDD branch prediction that corresponds to the SDD predicted outcome. The SDD branch table is configured to store at least one record and may be populated at runtime. Each record may contain a branch IP field, a load IP field, a store IP field, a comparison info field and at least one of a store value field and/or a predicted outcome field.

Figure 3:
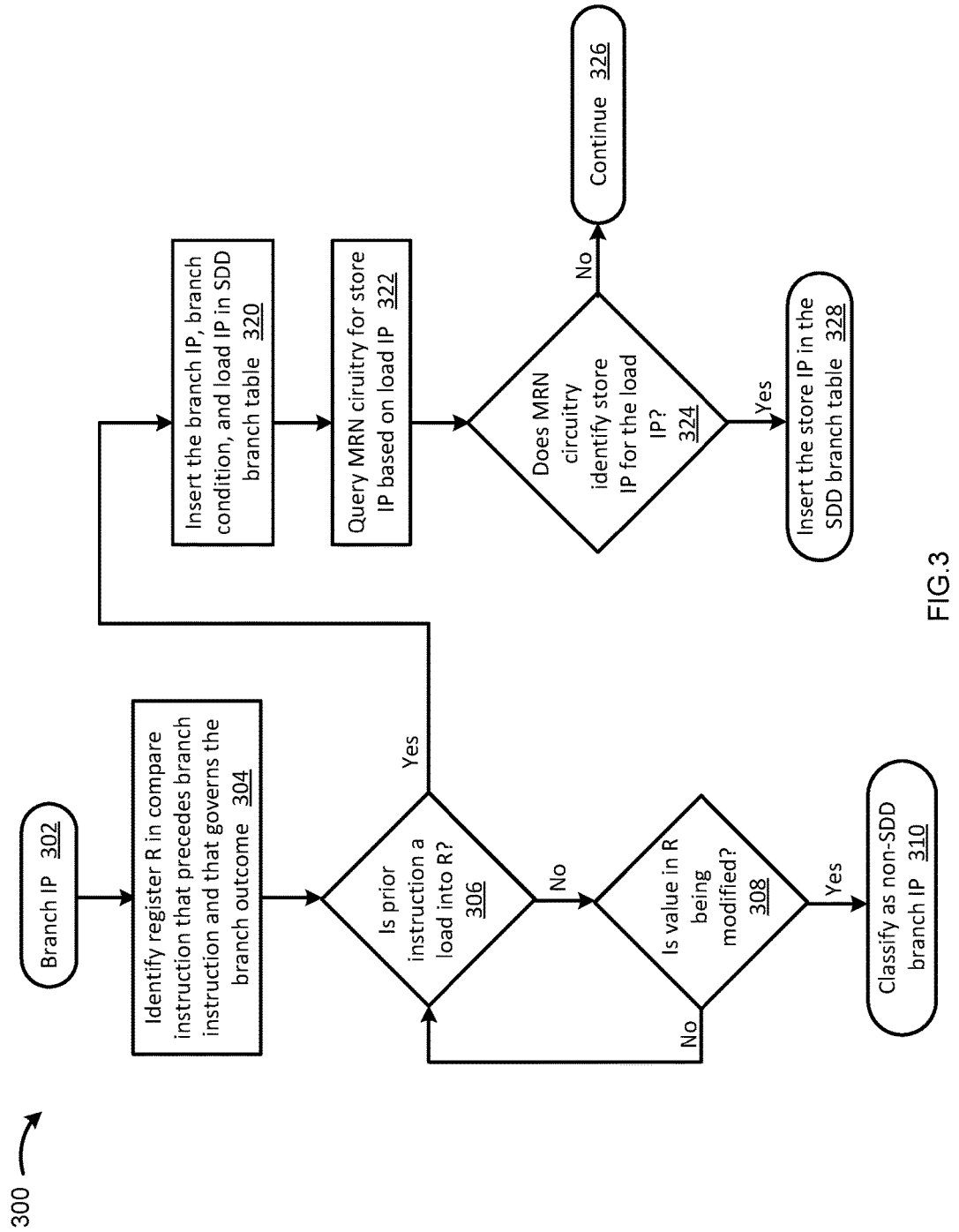
FIG. 3 is a flowchart of SDD branch detection operations according to various embodiments of the present disclosure.

FIG. 3 is a flowchart 300 of SDD branch detection operations according to various embodiments of the present disclosure. In particular, the flowchart 300 illustrates identifying load-store pairs for SDD branch instructions. The operations may be performed, for example, by elements of branch prediction unit 100, e.g., SDD branch prediction circuitry 102 and/or MRN circuitry 114 of FIG. 1.

Operations of this embodiment may begin with receiving an instruction pointer ("branch IP") associated with a branch instruction at operation 302. A register, R, in a compare instruction that precedes the branch instruction and that governs the outcome of the branch may be identified at operation 304. Whether a prior instruction is a load into the register, R, may be determined at operation 306. If the prior instruction is not a load into the register, R, then whether a value in register, R, is being modified may be determined at operation 308. If a value in register, R, is being modified, then the branch instruction may be classified as a non-SDD branch IP at operation 310. If the value in register, R, is not being modified, then program flow may proceed to operation 306. Operations 306 and 308 are configured to detect a load instruction in a window of instructions preceding the branch instruction and to determine whether a loaded value may be modified prior to access by the compare instruction.

If the prior instruction is a load into the register, R, then the branch IP, branch condition, and load IP may be inserted in the SDD branch table at operation 320. MRN circuitry may be queried for a store IP based on the load IP at operation 322. Whether the MRN circuitry identifies a store IP corresponding to the load IP may be determined at operation 324. If the MRN circuitry does not identify a store IP corresponding to the load IP, program flow may then continue at operation 326. If the MRN circuitry does identify a store IP corresponding to the load IP, then the store IP may be inserted in the SDD branch table at operation 328.

Thus, a load-store pair may be identified for an SDD branch instruction.

Figure 4:
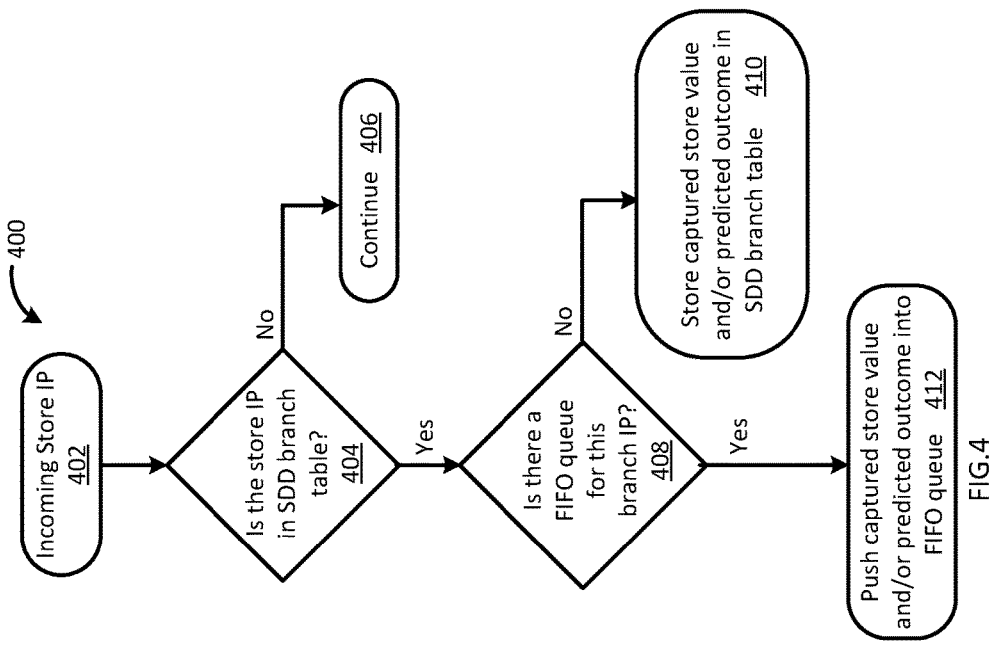
FIG. 4 is a flowchart of store dispatch responsive operations according to various embodiments of the present disclosure.

FIG. 4 is a flowchart 400 of store dispatch responsive operations according to various embodiments of the present disclosure. In particular, the flowchart 400 illustrates capturing a store value and determining a branch prediction based, at least in part, on the store value. The operations may be performed, for example, by elements of branch prediction unit 100, e.g., SDD branch prediction circuitry 102 of FIG. 1.

Operations of this embodiment may begin with receiving an incoming store IP at operation 402. Whether the store IP is in the SDD branch table may be determined at operation 404. If the store IP is not in the SDD branch table then program flow may continue at operation 406. If the store IP is included in the SDD branch table, then whether there is a FIFO queue for the corresponding branch IP may be determined at operation 408. If there is not a FIFO queue for this branch IP, then a captured store value and/or predicted outcome may be stored in SDD branch table at operation 410. If there is a FIFO queue for this branch IP, then the captured store value and/or predicted outcome may be pushed into the FIFO queue at operation 412.

Thus, a store value may be captured, a branch outcome predicted and the predicted outcome stored in or associated with the SDD branch table.

Figure 5:
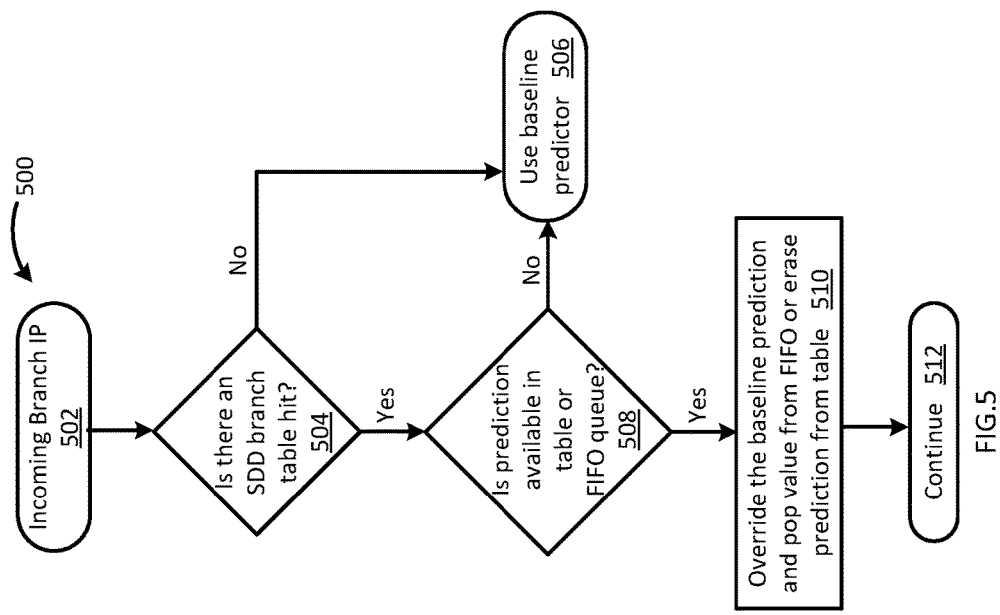
FIG. 5 is a flowchart of branch prediction operations according to various embodiments of the present disclosure.

FIG. 5 is a flowchart 500 of branch prediction operations according to various embodiments of the present disclosure. In particular, the flowchart 500 illustrates utilizing an SDD branch table to make a branch prediction. The operations may be performed, for example, by elements of branch prediction unit 100, e.g., SDD branch prediction circuitry 102 and/or baseline branch prediction circuitry 110 of FIG. 1.

Operations of this embodiment may begin with receiving or retrieving an incoming branch IP at operation 502. Whether there is an SDD branch table hit may be determined at operation 504. If there is not SDD branch table hit, then a baseline predictor may be used at operation 506. If there is an SDD branch table hit, then whether there is a branch prediction available in the SDD branch table or a corresponding FIFO queue may be determined at operation 508. If there is no branch prediction available, then program flow may proceed to operation 506. If there is a branch prediction available, the baseline prediction may be overridden by the SDD branch prediction and a value popped from the FIFO queue or erased from the SDD branch table at operation 510. Program flow may then continue at operation 512.

Thus, an SDD branch table may be utilized to provide an SDD branch prediction and override a baseline prediction when an SDD branch prediction is available.

While the flowchart of FIGS. 3, 4 and 5 illustrate operations according various embodiments, it is to be understood that not all of the operations depicted in FIGS. 3, 4 and 5 are necessary for other embodiments. In addition, it is fully contemplated herein that in other embodiments of the present disclosure, the operations depicted in FIGS. 3, 4 and/or 5 and/or other operations described herein may be combined in a manner not specifically shown in any of the drawings, and such embodiments may include less or more operations than are illustrated in FIGS. 3, 4 and 5. Thus, claims directed to features and/or operations that are not exactly shown in one drawing are deemed within the scope and content of the present disclosure. The figures below detail exemplary architectures and systems to implement embodiments of the above. In some embodiments, one or more hardware components and/or instructions described above are emulated as detailed below, or implemented as software modules.

Embodiments of the instruction(s) detailed above are embodied may be embodied in a "generic vector friendly instruction format" which is detailed below. In other embodiments, such a format is not utilized and another instruction format is used, however, the description below of the writemask registers, various data transformations (swizzle, broadcast, etc.), addressing, etc. is generally applicable to the description of the embodiments of the instruction(s) above. Additionally, exemplary systems, architectures, and pipelines are detailed below. Embodiments of the instruction(s) above may be executed on such systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

The instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 6B:
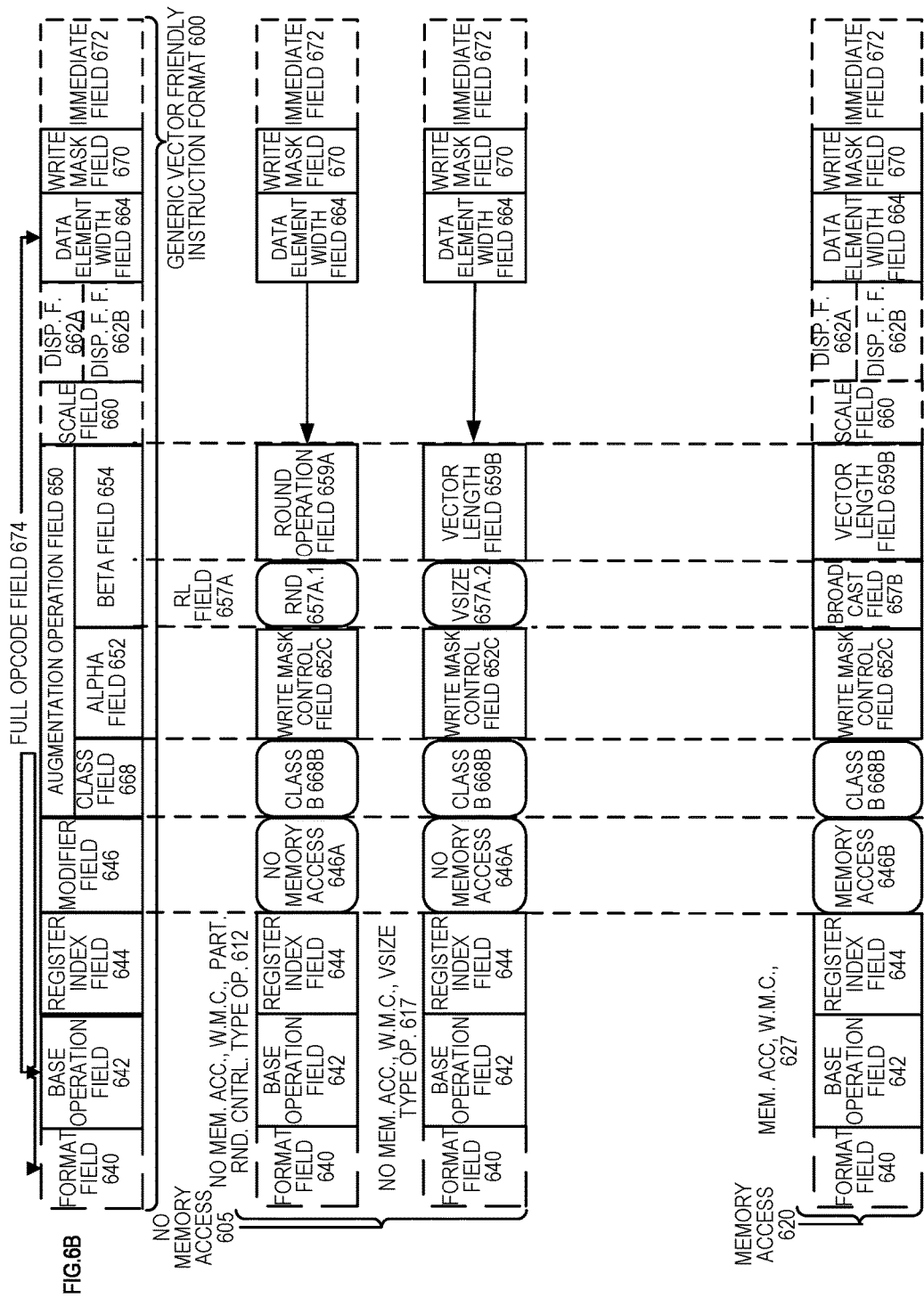

FIGS. 6A-6B are block diagrams illustrating a generic vector friendly instruction format and instruction templates thereof according to embodiments of the disclosure. FIG. 6A is a block diagram illustrating a generic vector friendly instruction format and class A instruction templates thereof according to embodiments of the disclosure; while FIG. 6B is a block diagram illustrating the generic vector friendly instruction format and class B instruction templates thereof according to embodiments of the disclosure. Specifically, a generic vector friendly instruction format 600 for which are defined class A and class B instruction templates, both of which include no memory access 605 instruction templates and memory access 620 instruction templates. The term generic in the context of the vector friendly instruction format refers to the instruction format not being tied to any specific instruction set.

While embodiments of the disclosure will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector operand sizes (e.g., 256 byte vector operands) with more, less, or different data element widths (e.g., 128 bit (16 byte) data element widths).

The class A instruction templates in FIG. 6A include: 1) within the no memory access 605 instruction templates there is shown a no memory access, full round control type operation 610 instruction template and a no memory access, data transform type operation 615 instruction template; and 2) within the memory access 620 instruction templates there is shown a memory access, temporal 625 instruction template and a memory access, non-temporal 630 instruction template. The class B instruction templates in FIG. 6B include: 1) within the no memory access 605 instruction templates there is shown a no memory access, write mask control, partial round control type operation 612 instruction template and a no memory access, write mask control, vsize type operation 617 instruction template; and 2) within the memory access 620 instruction templates there is shown a memory access, write mask control 627 instruction template.

The generic vector friendly instruction format 600 includes the following fields listed below in the order illustrated in FIGS. 6A-6B.

Format field 640—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 642—its content distinguishes different base operations.

Register index field 644—its content, directly or through address generation, specifies the locations of the source and destination operands, be they in registers or in memory. These include a sufficient number of bits to select N registers from a PxQ (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 646—its content distinguishes occurrences of instructions in the generic vector instruction format that specify memory access from those that do not; that is, between no memory access 605 instruction templates and memory access 620 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 650—its content distinguishes which one of a variety of different operations to be performed in addition to the base operation. This field is context specific. In one embodiment of the disclosure, this field is divided into a class field 668, an alpha field 652, and a beta field 654. The augmentation operation field 650 allows common groups of operations to be performed in a single instruction rather than 2, 3, or 4 instructions.

Scale field 660—its content allows for the scaling of the index field's content for memory address generation (e.g., for address generation that uses $2^{scale}*\text{index}+\text{base}$).

Displacement Field 662A—its content is used as part of memory address generation (e.g., for address generation that uses $2^{scale}*\text{index}+\text{base}+\text{displacement}$).

Displacement Factor Field 662B (note that the juxtaposition of displacement field 662A directly over displacement factor field 662B indicates one or the other is used)—its content is used as part of address generation; it specifies a displacement factor that is to be scaled by the size of a memory access (N)—where N is the number of bytes in the memory access (e.g., for address generation that uses $2^{scale}*\text{index}+\text{base}+\text{scaled displacement}$). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 674 (described later herein) and the data manipulation field 654C. The displacement field 662A and the displacement factor field 662B are optional in the sense that they are not used for the no memory access 605 instruction templates and/or different embodiments may implement only one or none of the two.

Data element width field 664—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 670—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 670 allows for partial vector operations, including loads, stores, arithmetic, logical, etc. While embodiments of the disclosure are described in which the write mask field's 670 content selects one of a number of write mask registers that contains the write mask to be used (and thus the write mask field's 670 content indirectly identifies that masking to be performed), alternative embodiments instead or additional allow the mask write field's 670 content to directly specify the masking to be performed.

Immediate field 672—its content allows for the specification of an immediate. This field is optional in the sense that is it not present in an implementation of the generic vector friendly format that does not support immediate and it is not present in instructions that do not use an immediate.

Class field 668—its content distinguishes between different classes of instructions. With reference to FIGS. 6A-B, the contents of this field select between class A and class B instructions. In FIGS. 6A-B, rounded corner squares are used to indicate a specific value is present in a field (e.g., class A 668A and class B 668B for the class field 668 respectively in FIGS. 6A-B).

Instruction Templates of Class A

In the case of the non-memory access 605 instruction templates of class A, the alpha field 652 is interpreted as an RS field 652A, whose content distinguishes which one of the different augmentation operation types are to be performed (e.g., round 652A.1 and data transform 652A.2 are respectively specified for the no memory access, round type operation 610 and the no memory access, data transform type operation 615 instruction templates), while the beta field 654 distinguishes which of the operations of the specified type is to be performed. In the no memory access 605 instruction templates, the scale field 660, the displacement field 662A, and the displacement scale filed 662B are not present.

No-Memory Access Instruction Templates—Full Round Control Type Operation

In the no memory access full round control type operation 610 instruction template, the beta field 654 is interpreted as a round control field 654A, whose content(s) provide static rounding. While in the described embodiments of the disclosure the round control field 654A includes a suppress all floating point exceptions (SAE) field 656 and a round operation control field 658, alternative embodiments may support may encode both these concepts into the same field or only have one or the other of these concepts/fields (e.g., may have only the round operation control field 658).

SAE field 656—its content distinguishes whether or not to disable the exception event reporting; when the SAE field's 656 content indicates suppression is enabled, a given instruction does not report any kind of floating-point exception flag and does not raise any floating point exception handler.

Round operation control field 658—its content distinguishes which one of a group of rounding operations to perform (e.g., Round-up, Round-down, Round-towards-zero and Round-to-nearest). Thus, the round operation control field 658 allows for the changing of the rounding mode on a per instruction basis. In one embodiment of the disclosure where a processor includes a control register for specifying rounding modes, the round operation control field's 650 content overrides that register value.

No Memory Access Instruction Templates—Data Transform Type Operation

In the no memory access data transform type operation 615 instruction template, the beta field 654 is interpreted as a data transform field 654B, whose content distinguishes which one of a number of data transforms is to be performed (e.g., no data transform, swizzle, broadcast).

In the case of a memory access 620 instruction template of class A, the alpha field 652 is interpreted as an eviction hint field 652B, whose content distinguishes which one of the eviction hints is to be used (in FIG. 6A, temporal 652B.1 and non-temporal 652B.2 are respectively specified for the memory access, temporal 625 instruction template and the memory access, non-temporal 630 instruction template), while the beta field 654 is interpreted as a data manipulation field 654C, whose content distinguishes which one of a number of data manipulation operations (also known as primitives) is to be performed (e.g., no manipulation; broadcast; up conversion of a source; and down conversion of a destination). The memory access 620 instruction templates include the scale field 660, and optionally the displacement field 662A or the displacement scale field 662B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 652 is interpreted as a write mask control (Z) field 652C, whose content distinguishes whether the write masking controlled by the write mask field 670 should be a merging or a zeroing.

In the case of the non-memory access 605 instruction templates of class B, part of the beta field 654 is interpreted as an RL field 657A, whose content distinguishes which one of the different augmentation operation types are to be performed (e.g., round 657A.1 and vector length (VSIZE) 657A.2 are respectively specified for the no memory access, write mask control, partial round control type operation 612 instruction template and the no memory access, write mask control, VSIZE type operation 617 instruction template), while the rest of the beta field 654 distinguishes which of the operations of the specified type is to be performed. In the no memory access 605 instruction templates, the scale field 660, the displacement field 662A, and the displacement scale filed 662B are not present.

In the no memory access, write mask control, partial round control type operation 610 instruction template, the rest of the beta field 654 is interpreted as a round operation field 659A and exception event reporting is disabled (a given instruction does not report any kind of floating-point exception flag and does not raise any floating point exception handler).

Round operation control field 659A—just as round operation control field 658, its content distinguishes which one of a group of rounding operations to perform (e.g., Round-up, Round-down, Round-towards-zero and Round-to-nearest). Thus, the round operation control field 659A allows for the changing of the rounding mode on a per instruction basis. In one embodiment of the disclosure where a processor includes a control register for specifying rounding modes, the round operation control field's 650 content overrides that register value.

In the no memory access, write mask control, VSIZE type operation 617 instruction template, the rest of the beta field 654 is interpreted as a vector length field 659B, whose content distinguishes which one of a number of data vector lengths is to be performed on (e.g., 128, 256, or 512 byte).

In the case of a memory access 620 instruction template of class B, part of the beta field 654 is interpreted as a broadcast field 657B, whose content distinguishes whether or not the broadcast type data manipulation operation is to be performed, while the rest of the beta field 654 is interpreted the vector length field 659B. The memory access 620 instruction templates include the scale field 660, and optionally the displacement field 662A or the displacement scale field 662B.

With regard to the generic vector friendly instruction format 600, a full opcode field 674 is shown including the format field 640, the base operation field 642, and the data element width field 664. While one embodiment is shown where the full opcode field 674 includes all of these fields, the full opcode field 674 includes less than all of these fields in embodiments that do not support all of them. The full opcode field 674 provides the operation code (opcode).

The augmentation operation field 650, the data element width field 664, and the write mask field 670 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the disclosure, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the disclosure). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the disclosure. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 7 is a block diagram illustrating an exemplary specific vector friendly instruction format according to embodiments of the disclosure. FIG. 7 shows a specific vector friendly instruction format 700 that is specific in the sense that it specifies the location, size, interpretation, and order of the fields, as well as values for some of those fields. The specific vector friendly instruction format 700 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 6 into which the fields from FIG. 7 map are illustrated.

It should be understood that, although embodiments of the disclosure are described with reference to the specific vector friendly instruction format 700 in the context of the generic vector friendly instruction format 600 for illustrative purposes, the disclosure is not limited to the specific vector friendly instruction format 700 except where claimed. For example, the generic vector friendly instruction format 600 contemplates a variety of possible sizes for the various fields, while the specific vector friendly instruction format 700 is shown as having fields of specific sizes. By way of specific example, while the data element width field 664 is illustrated as a one bit field in the specific vector friendly instruction format 700, the disclosure is not so limited (that is, the generic vector friendly instruction format 600 contemplates other sizes of the data element width field 664).

The generic vector friendly instruction format 600 includes the following fields listed below in the order illustrated in FIG. 7A.

EVEX Prefix (Bytes 0-3) 702—is encoded in a four-byte form.

Format Field 640 (EVEX Byte 0, bits [7:0])—the first byte (EVEX Byte 0) is the format field 640 and it contains 0x62 (the unique value used for distinguishing the vector friendly instruction format in one embodiment of the disclosure).

The second-fourth bytes (EVEX Bytes 1-3) include a number of bit fields providing specific capability.

REX field 705 (EVEX Byte 1, bits [7-5])—consists of a EVEX.R bit field (EVEX Byte 1, bit [7]—R), EVEX.X bit field (EVEX byte 1, bit [6]—X), and 657BEX byte 1, bit[5]—B). The EVEX.R, EVEX.X, and EVEX.B bit fields provide the same functionality as the corresponding VEX bit fields, and are encoded using 1s complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 610—this is the first part of the REX' field 610 and is the EVEX.R' bit field (EVEX Byte 1, bit [4]—R') that is used to encode either the upper 16 or lower 16 of the extended 32 register set. In one embodiment of the disclosure, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the disclosure do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 715 (EVEX byte 1, bits [3:0]—mmmm)—its content encodes an implied leading opcode byte (0F, 0F 38, or 0F 3).

Data element width field 664 (EVEX byte 2, bit [7]—W)—is represented by the notation EVEX.W. EVEX.W is used to define the granularity (size) of the datatype (either 32-bit data elements or 64-bit data elements).

EVEX.vvvv 720 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 720 encodes the 4 low-order bits of the first source register specifier stored in inverted (1s complement) form. Depending on the instruction, an extra different EVEX bit field is used to extend the specifier size to 32 registers.

EVEX.U 668 Class field (EVEX byte 2, bit [2]-U)—If EVEX.U=0, it indicates class A or EVEX.U0; if EVEX.U=1, it indicates class B or EVEX.U1.

Prefix encoding field 725 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 652 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 654 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 610—this is the remainder of the REX' field and is the EVEX.V' bit field (EVEX Byte 3, bit [3]—V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 670 (EVEX byte 3, bits [2:0]-kkk)—its content specifies the index of a register in the write mask registers as previously described. In one embodiment of the disclosure, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 730 (Byte 4) is also known as the opcode byte. Part of the opcode is specified in this field.

MOD R/M Field 740 (Byte 5) includes MOD field 742, Reg field 744, and R/M field 746. As previously described, the MOD field's 742 content distinguishes between memory access and non-memory access operations. The role of Reg field 744 can be summarized to two situations: encoding either the destination register operand or a source register operand, or be treated as an opcode extension and not used to encode any instruction operand. The role of R/M field 746 may include the following: encoding the instruction operand that references a memory address, or encoding either the destination register operand or a source register operand.

Scale, Index, Base (SIB) Byte (Byte 6)—As previously described, the scale field's 650 content is used for memory address generation. SIB.xxx 754 and SIB.bbb 756—the contents of these fields have been previously referred to with regard to the register indexes Xxxx and Bbbb.

Displacement field 662A (Bytes 7-10)—when MOD field 742 contains 10, bytes 7-10 are the displacement field 662A, and it works the same as the legacy 32-bit displacement (disp32) and works at byte granularity.

Displacement factor field 662B (Byte 7)—when MOD field 742 contains 01, byte 7 is the displacement factor field 662B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 662B is a reinterpretation of disp8; when using displacement factor field 662B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 662B substitutes the legacy x86 instruction set 8-bit displacement. Thus, the displacement factor field 662B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 672 operates as previously described.

Full Opcode Field

FIG. 7B is a block diagram illustrating the fields of the specific vector friendly instruction format 700 that make up the full opcode field 674 according to one embodiment of the disclosure. Specifically, the full opcode field 674 includes the format field 640, the base operation field 642, and the data element width (W) field 664. The base operation field 642 includes the prefix encoding field 725, the opcode map field 715, and the real opcode field 730.

Register Index Field

FIG. 7C is a block diagram illustrating the fields of the specific vector friendly instruction format 700 that make up the register index field 644 according to one embodiment of the disclosure. Specifically, the register index field 644 includes the REX field 705, the REX' field 710, the MODR/M.reg field 744, the MODR/M.r/m field 746, the VVVV field 720, xxx field 754, and the bbb field 756.

Augmentation Operation Field

FIG. 7D is a block diagram illustrating the fields of the specific vector friendly instruction format 700 that make up the augmentation operation field 650 according to one embodiment of the disclosure. When the class (U) field 668 contains 0, it signifies EVEX.U0 (class A 668A); when it contains 1, it signifies EVEX.U1 (class B 668B). When U=0 and the MOD field 742 contains 11 (signifying a no memory access operation), the alpha field 652 (EVEX byte 3, bit [7]—EH) is interpreted as the rs field 652A. When the rs field 652A contains a 1 (round 652A.1), the beta field 654 (EVEX byte 3, bits [6:4]—SSS) is interpreted as the round control field 654A. The round control field 654A includes a one bit SAE field 656 and a two bit round operation field 658. When the rs field 652A contains a 0 (data transform 652A.2), the beta field 654 (EVEX byte 3, bits [6:4]—SSS) is interpreted as a three bit data transform field 654B. When U=0 and the MOD field 742 contains 00, 01, or 10 (signifying a memory access operation), the alpha field 652 (EVEX byte 3, bit [7]—EH) is interpreted as the eviction hint (EH) field 652B and the beta field 654 (EVEX byte 3, bits [6:4]—SSS) is interpreted as a three bit data manipulation field 654C.

When U=1, the alpha field 652 (EVEX byte 3, bit [7]—EH) is interpreted as the write mask control (Z) field 652C. When U=1 and the MOD field 742 contains 11 (signifying a no memory access operation), part of the beta field 654 (EVEX byte 3, bit [4]—$S_0$) is interpreted as the RL field 657A; when it contains a 1 (round 657A.1) the rest of the beta field 654 (EVEX byte 3, bit [6-5]—$S_{2-1}$) is interpreted as the round operation field 659A, while when the RL field 657A contains a 0 (VSIZE 657.A2) the rest of the beta field 654 (EVEX byte 3, bit [6-5]—$S_{2-1}$) is interpreted as the vector length field 659B (EVEX byte 3, bit [6-5]—$L_{1-0}$). When U=1 and the MOD field 742 contains 00, 01, or 10 (signifying a memory access operation), the beta field 654 (EVEX byte 3, bits [6:4]—SSS) is interpreted as the vector length field 659B (EVEX byte 3, bit [6-5]—$L_{1-0}$) and the broadcast field 657B (EVEX byte 3, bit [4]—B).

Exemplary Register Architecture

FIG. 8 is a block diagram of a register architecture 800 according to one embodiment of the disclosure. In the embodiment illustrated, there are 32 vector registers 810 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 700 operates on these overlaid register file as illustrated in the below tables.

| Adjustable Vector Length | Class | Operations | Registers |
|---|---|---|---|
| Instruction Templates that do not include the vector length field 659B | A (FIG. 6A; U = 0) | 610, 615, 625, 630 | zmm registers (the vector length is 64 byte) |
| | B (FIG. 6B; U = 1) | 612 | zmm registers (the vector length is 64 byte) |
| Instruction templates that do include the vector length field 659B | B (FIG. 6B; U = 1) | 617, 627 | zmm, ymm, or xmm registers (the vector length is 64 byte, 32 byte, or 16 byte) depending on the vector length field 659B |

In other words, the vector length field 659B selects between a maximum length and one or more other shorter lengths, where each such shorter length is half the length of the preceding length; and instructions templates without the vector length field 659B operate on the maximum vector length. Further, in one embodiment, the class B instruction templates of the specific vector friendly instruction format 700 operate on packed or scalar single/double-precision floating point data and packed or scalar integer data. Scalar operations are operations performed on the lowest order data element position in an zmm/ymm/xmm register; the higher order data element positions are either left the same as they were prior to the instruction or zeroed depending on the embodiment.

Write mask registers 815—in the embodiment illustrated, there are 8 write mask registers (k0 through k7), each 64 bits in size. In an alternate embodiment, the write mask registers 815 are 16 bits in size. As previously described, in one embodiment of the disclosure, the vector mask register k0 cannot be used as a write mask; when the encoding that would normally indicate k0 is used for a write mask, it selects a hardwired write mask of 0xFFFF, effectively disabling write masking for that instruction.

General-purpose registers 825—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 845, on which is aliased the MMX packed integer flat register file 850—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the disclosure may use wider or narrower registers. Additionally, alternative embodiments of the disclosure may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 9A is a block diagram illustrating both an exemplary in-order pipeline and an exemplary register renaming, out-of-order issue/execution pipeline according to embodiments of the disclosure. FIG. 9B is a block diagram illustrating both an exemplary embodiment of an in-order architecture core and an exemplary register renaming, out-of-order issue/execution architecture core to be included in a processor according to embodiments of the disclosure. The solid lined boxes in FIGS. 9A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 9A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 9B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/ allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/ vector integer/vector floating point pipeline, and/or a memory access pipeline that each have their own scheduler unit, physical register file(s) unit, and/or execution cluster— and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 10B:
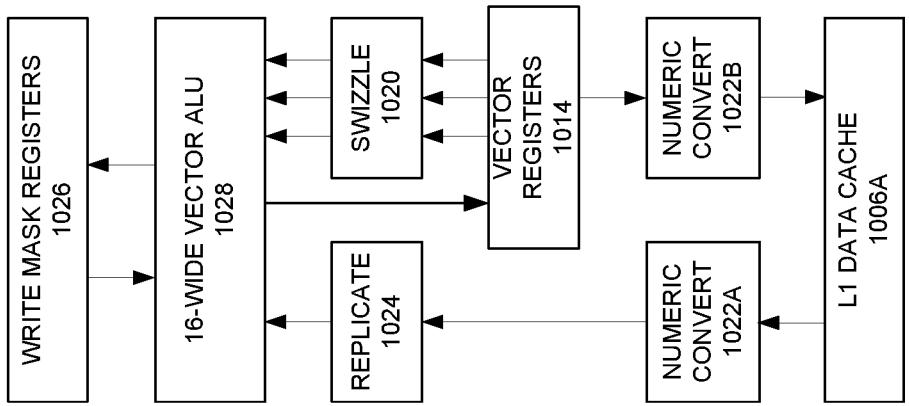
FIGS. 10A-B illustrate a block diagram of a more specific exemplary in-order core architecture, which core would be one of several logic blocks (including other cores of the same type and/or different types) in a chip.
Figure 10A:
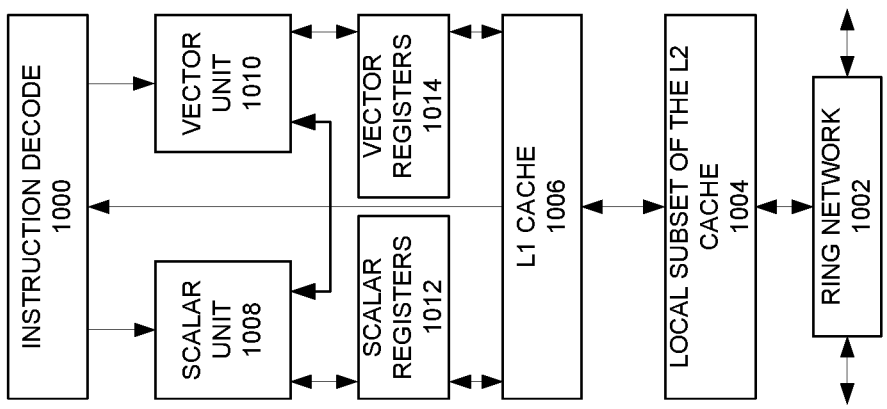

FIGS. 10A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 10A is a block diagram of a single processor core, along with its connection to the on-die interconnect network 1002 and with its local subset of the Level 2 (L2) cache 1004, according to embodiments of the disclosure. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the disclosure may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 10B is an expanded view of part of the processor core in FIG. 10A according to embodiments of the disclosure. FIG. 10B includes an L1 data cache 1006A part of the L1 cache 1004, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 11:
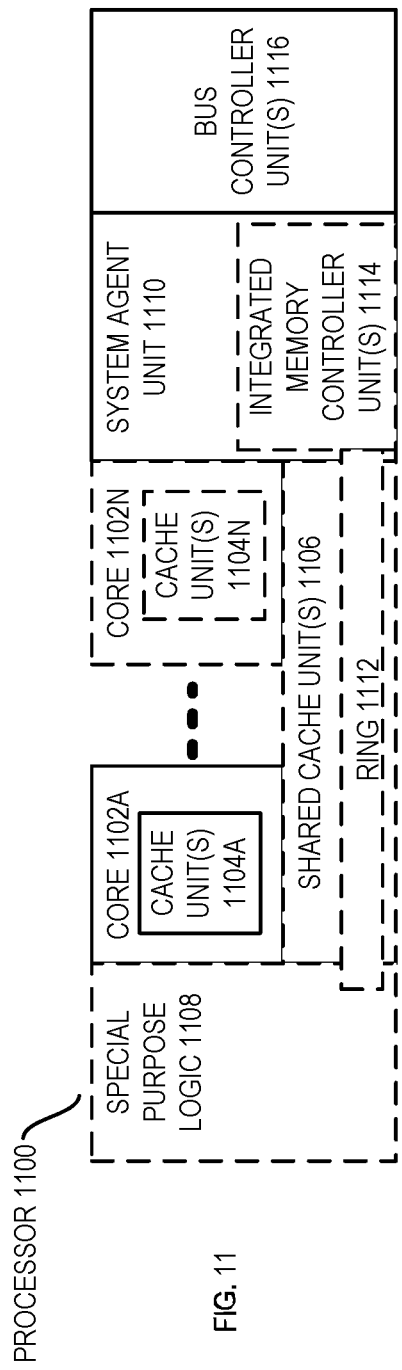
FIG. 11 is a block diagram of a processor that may have more than one core, may have an integrated memory controller, and may have integrated graphics according to embodiments of the disclosure.

FIG. 11 is a block diagram of a processor 1100 that may have more than one core, may have an integrated memory controller, and may have integrated graphics according to embodiments of the disclosure. The solid lined boxes in FIG. 11 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multi-threading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 12-15 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 12:
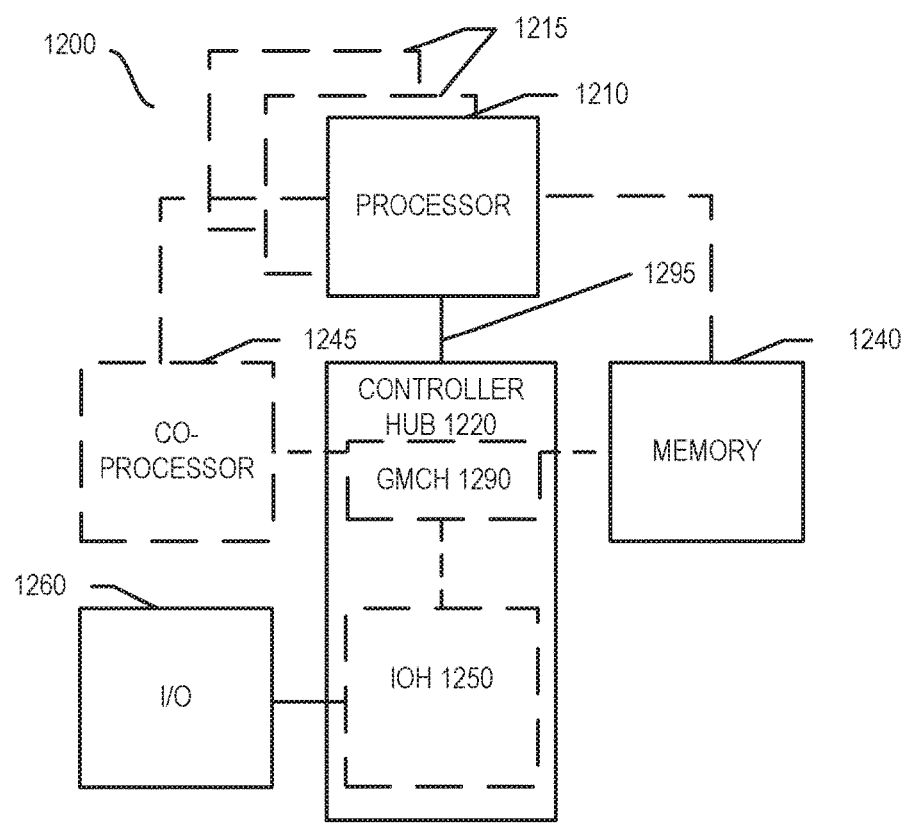
FIGS. 12-15 are block diagrams of exemplary computer architectures.

Referring now to FIG. 12, shown is a block diagram of a system 1200 in accordance with one embodiment of the present disclosure. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 is couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 12 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 13:
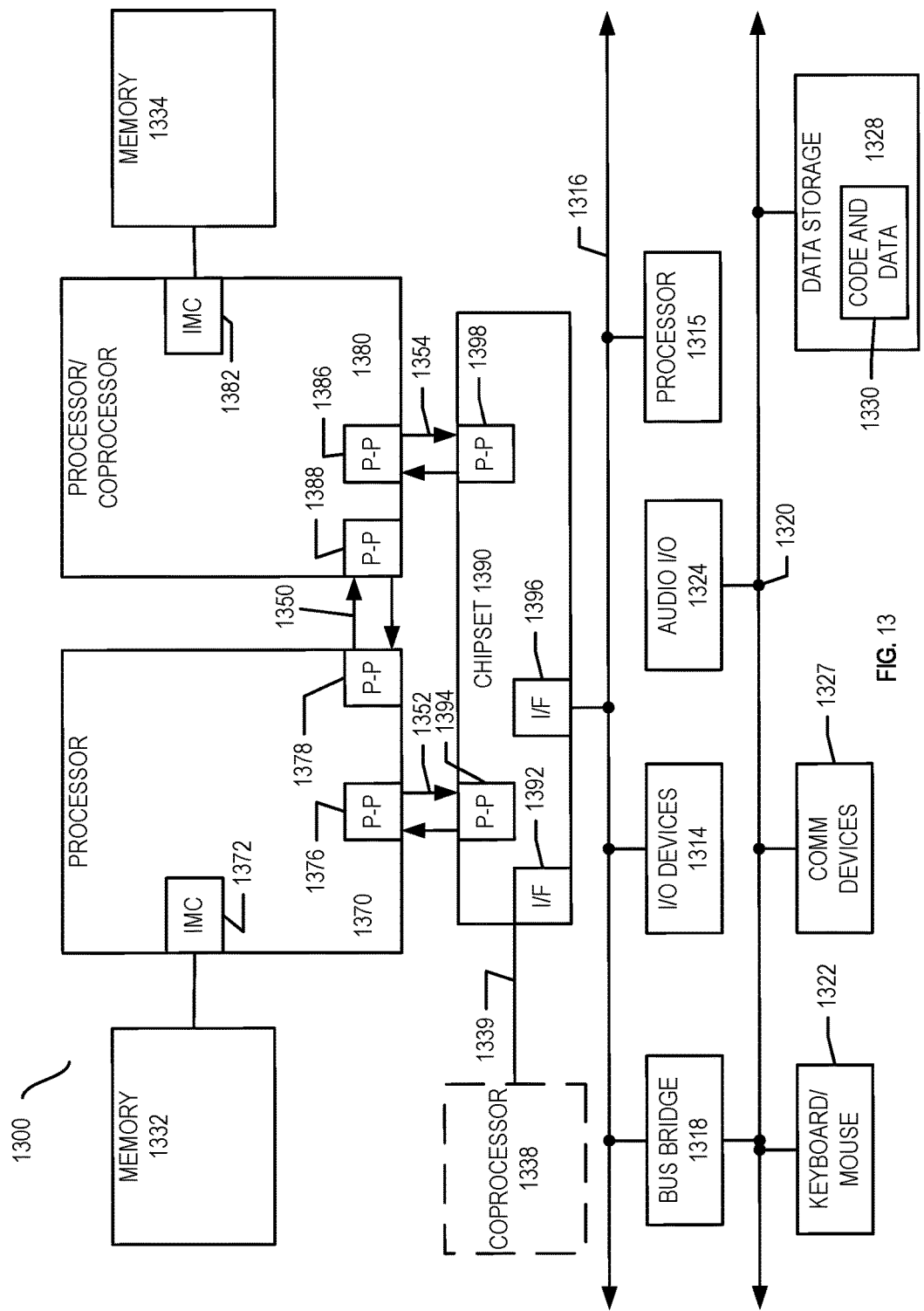

Referring now to FIG. 13, shown is a block diagram of a first more specific exemplary system 1300 in accordance with an embodiment of the present disclosure. As shown in FIG. 13, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the disclosure, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 13, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present disclosure is not so limited.

As shown in FIG. 13, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 13, a system may implement a multi-drop bus or other such architecture.

Figure 14:
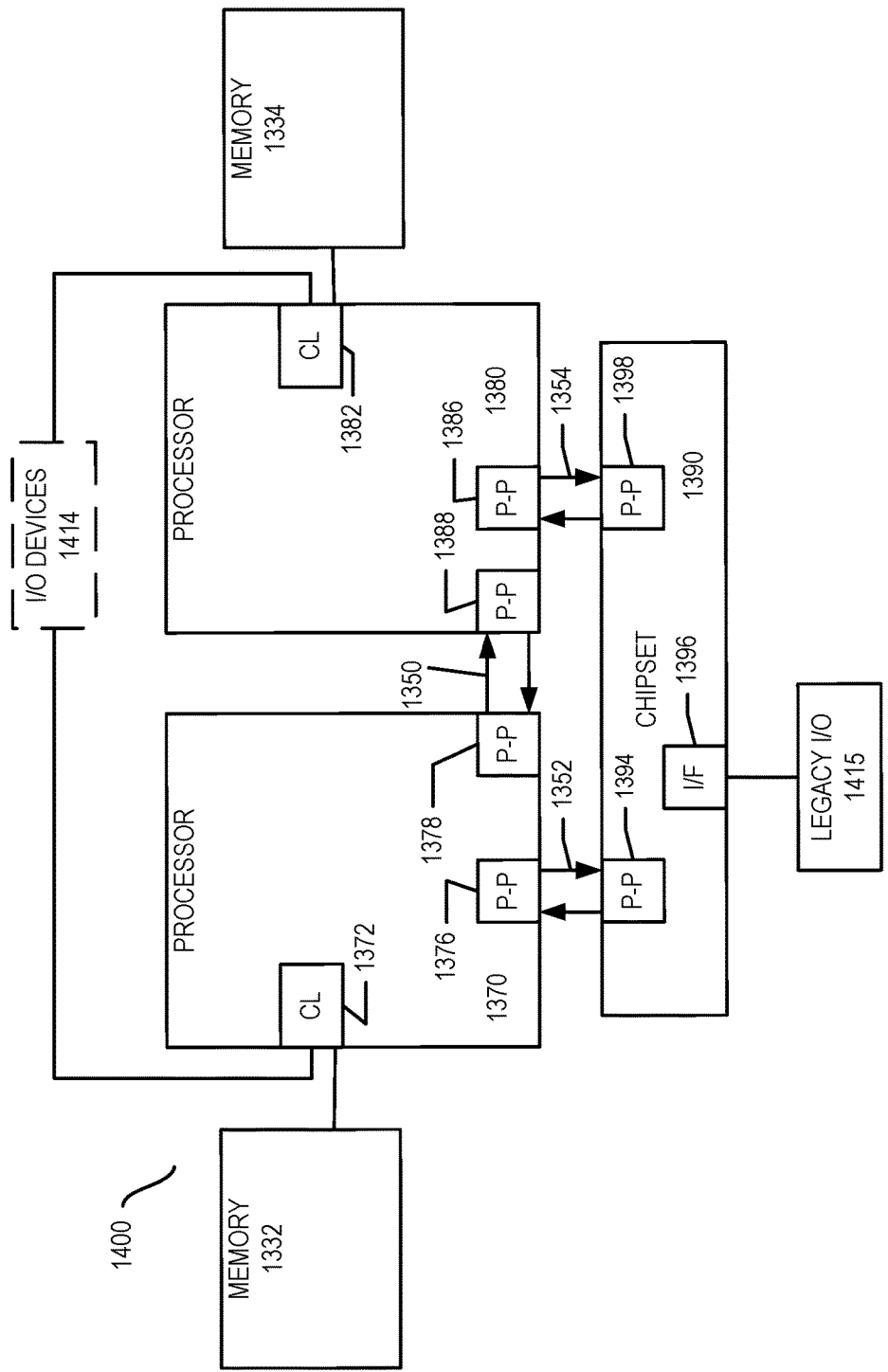

Referring now to FIG. 14, shown is a block diagram of a second more specific exemplary system 1400 in accordance with an embodiment of the present disclosure. Like elements in FIGS. 13 and 14 bear like reference numerals, and certain aspects of FIG. 13 have been omitted from FIG. 14 in order to avoid obscuring other aspects of FIG. 14.

FIG. 14 illustrates that the processors 1370, 1380 may include integrated memory and I/O control logic ("CL") 1372 and 1382, respectively. Thus, the CL 1372, 1382 include integrated memory controller units and include I/O control logic. FIG. 14 illustrates that not only are the memories 1332, 1334 coupled to the CL 1372, 1382, but also that I/O devices 1414 are also coupled to the control logic 1372, 1382. Legacy I/O devices 1415 are coupled to the chipset 1390.

Figure 15:
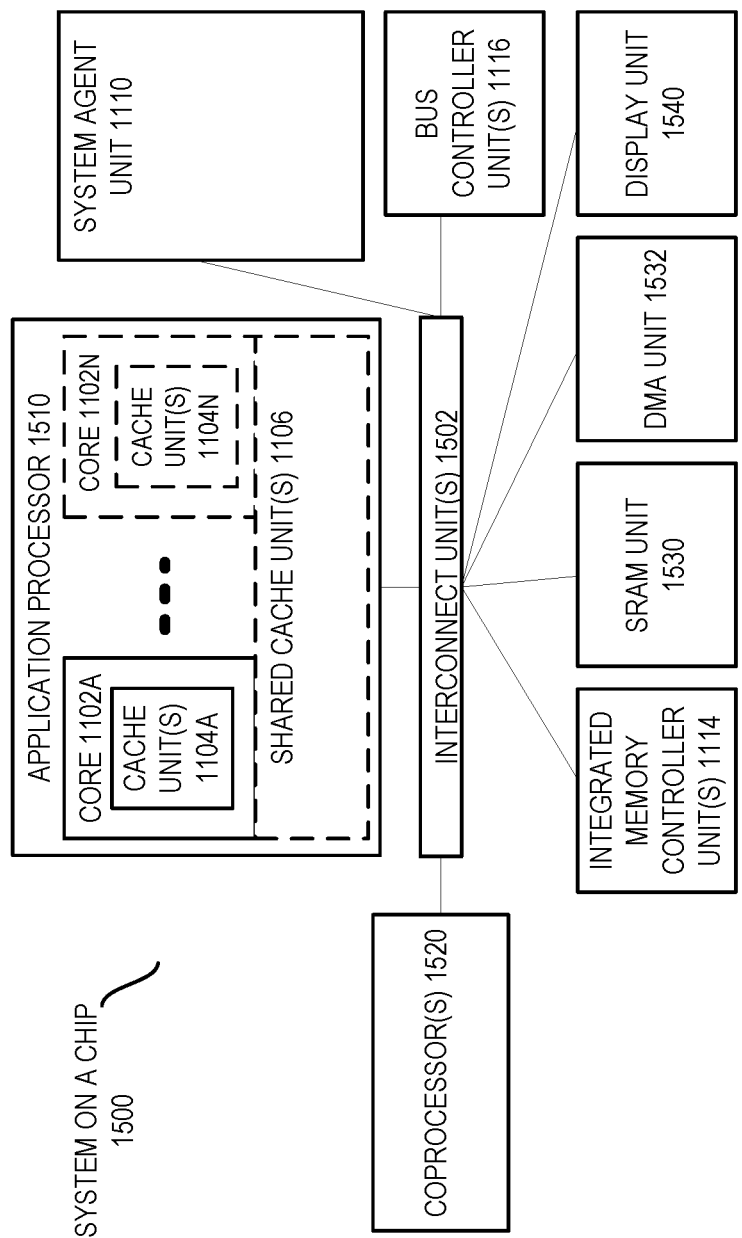

Referring now to FIG. 15, shown is a block diagram of a SoC 1500 in accordance with an embodiment of the present disclosure. Similar elements in FIG. 11 bear like reference numerals. Also, dashed lined boxes are optional features on more advanced SoCs. In FIG. 15, an interconnect unit(s) 1502 is coupled to: an application processor 1510 which includes a set of one or more cores 202A-N and shared cache unit(s) 1106; a system agent unit 1110; a bus controller unit(s) 1116; an integrated memory controller unit(s) 1114;

a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the disclosure may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 13, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the disclosure also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 16 is a block diagram contrasting the use of a software instruction converter to convert binary instructions in a source instruction set to binary instructions in a target instruction set according to embodiments of the disclosure. In the illustrated embodiment, the instruction converter is a software instruction converter, although alternatively the instruction converter may be implemented in software, firmware, hardware, or various combinations thereof. FIG. 16 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 16 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

As used in any embodiment herein, the term "logic" may refer to an app, software, firmware and/or circuitry configured to perform any of the aforementioned operations. Software may be embodied as a software package, code, instructions, instruction sets and/or data recorded on non-transitory computer readable storage medium. Firmware may be embodied as code, instructions or instruction sets and/or data that are hard-coded (e.g., nonvolatile) in memory devices.

"Circuitry," as used in any embodiment herein, may comprise, for example, singly or in any combination, hard-wired circuitry, programmable circuitry, state machine circuitry, logic and/or firmware that stores instructions executed by programmable circuitry. The circuitry may be embodied as an integrated circuit, such as an integrated circuit chip. In some embodiments, the circuitry may be formed, at least in part, by the processors 108 executing code and/or instructions sets (e.g., software, firmware, etc.) corresponding to the functionality described herein, thus transforming a general-purpose processor into a specific-purpose processing environment to perform one or more of the operations described herein. In some embodiments, the various components and circuitry of the memory controller circuitry or other systems may be combined in a system-on-a-chip (SoC) architecture.

Embodiments of the operations described herein may be implemented in a computer-readable storage device having stored thereon instructions that when executed by one or more processors perform the methods. The processor may include, for example, a processing unit and/or programmable circuitry. The storage device may include a machine readable storage device including any type of tangible, non-transitory storage device, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of storage devices suitable for storing electronic instructions.

In some embodiments, a hardware description language (HDL) may be used to specify circuit and/or logic implementation(s) for the various logic and/or circuitry described herein. For example, in one embodiment the hardware description language may comply or be compatible with a very high speed integrated circuits (VHSIC) hardware description language (VHDL) that may enable semiconductor fabrication of one or more circuits and/or logic described herein. The VHDL may comply or be compatible with IEEE Standard 1076-1987, IEEE Standard 1076.2, IEEE1076.1, IEEE Draft 3.0 of VHDL-2006, IEEE Draft 4.0 of VHDL-2008 and/or other versions of the IEEE VHDL standards and/or other hardware description standards.

In some embodiments, a Verilog hardware description language (HDL) may be used to specify circuit and/or logic implementation(s) for the various logic and/or circuitry described herein. For example, in one embodiment, the HDL may comply or be compatible with IEEE standard 62530-2011: SystemVerilog—Unified Hardware Design, Specification, and Verification Language, dated Jul. 7, 2011; IEEE Std 1800™-2012: IEEE Standard for SystemVerilog—Unified Hardware Design, Specification, and Verification Language, released Feb. 21, 2013; IEEE standard 1364-2005: IEEE Standard for Verilog Hardware Description Language, dated Apr. 18, 2006 and/or other versions of Verilog HDL and/or SystemVerilog standards.

EXAMPLES

Examples of the present disclosure include subject material such as a method, means for performing acts of the method, a device, or of an apparatus or system related to dynamic detection and prediction for store-dependent branches, as discussed below.

Example 1

According to this example, there is provided an apparatus. The apparatus includes a store direct dependent (SDD) branch prediction circuitry and an SDD management circuitry. The SDD branch prediction circuitry is to store an SDD branch table. The SDD branch table is to store at least one record. Each record includes a branch instruction pointer (IP) field, a load IP field, a store IP field, a comparison info field and at least one of a store value field and/or a predicted outcome field. The SDD management circuitry is to populate the SDD branch table at runtime and to override a baseline branch prediction associated with an incoming branch IP with an SDD branch prediction, if the SDD branch table contains a first record populated with the incoming branch IP and at least one of a store value and/or an SDD predicted outcome.

Example 2

This example includes the elements of example 1, wherein the first record is populated with a store IP and the SDD management circuitry is to determine the SDD branch prediction based, at least in part, on a store value associated with the store IP.

Example 3

This example includes the elements of example 1, wherein the populating the SDD branch table includes querying a memory renaming (MRN) circuitry using a load IP of a load instruction to determine a store IP of a store instruction, the store value associated with the store instruction.

Example 4

This example includes the elements of example 1, wherein the populating the SDD branch table includes determining a load IP of a load instruction based, at least in part, on a sequence of instructions preceding a SDD branch instruction, the load instruction to load a load value into a register, the load instruction related to a compare instruction that precedes the branch instruction in the sequence of instructions, the load value governing a branch outcome.

Example 5

This example includes the elements according to any one of examples 1 to 4, wherein the comparison info field is to contain one or more of a compare value, an indication whether a compare operation is between a store value and a compare value or between two store values and/or a compare condition.

Example 6

This example includes the elements according to any one of examples 1 to 4, wherein the predicted outcome field is to store the predicted outcome or a pointer to a first in first out (FIFO) queue, the FIFO queue to store a plurality of SDD predicted outcomes associated with a respective one branch IP.

Example 7

This example includes the elements according to any one of examples 1 to 4, wherein a selected record includes a first load IP field, a first store IP field, a second load IP field, a second store IP field and the predicted outcome field or a first store value field and a second store value field, the predicted outcome determined based, at least in part, on a comparison of a first store value and a second store value.

Example 8

This example includes the elements according to any one of examples 1 to 4, wherein the SDD management circuitry is to erase the predicted outcome or pop a value from a first in first out (FIFO) queue, if the baseline branch instruction is overridden.

Example 9

This example includes the elements according to any one of examples 1 to 4, wherein the SDD management circuitry is to store the at least one of the store value and/or the SDD predicted outcome in the SDD branch table if a confidence counter value is greater than or equal to a threshold.

Example 10

This example includes the elements of example 4, further including an SDD buffer to store a number of past instructions, the past instructions including the sequence of instructions.

Example 11

According to this example, there is provided a method. The method includes storing, by a store direct dependent (SDD) branch prediction circuitry, an SDD branch table. The SDD branch table is to store at least one record. Each record includes a branch instruction pointer (IP) field, a load IP field, a store IP field, a comparison info field and at least one of a store value field and/or a predicted outcome field. The method further includes populating, by an SDD management circuitry, the SDD branch table at runtime and overriding, by the SDD management circuitry, a baseline branch prediction associated with an incoming branch IP with an SDD branch prediction, if the SDD branch table contains a first record populated with the incoming branch IP and at least one of a store value and/or an SDD predicted outcome.

Example 12

This example includes the elements of example 11, wherein the first record is populated with a store IP and further including determining, by the SDD management circuitry, the SDD branch prediction based, at least in part, on a store value associated with the store IP.

Example 13

This example includes the elements of example 11, wherein the populating the SDD branch table includes querying a memory renaming (MRN) circuitry using a load IP of a load instruction to determine a store IP of a store instruction, the store value associated with the store instruction.

Example 14

This example includes the elements of example 11, wherein the populating the SDD branch table includes determining a load IP based, at least in part, on a sequence of instructions preceding a SDD branch instruction, the load instruction to load a load value into a register, the load instruction related to a compare instruction that precedes the branch instruction in the sequence of instructions, the load value governing a branch outcome.

Example 15

This example includes the elements of example 11, wherein the comparison info field is to contain one or more of a compare value, an indication whether a compare operation is between a store value and a compare value or between two store values and/or a compare condition.

Example 16

This example includes the elements of example 11, wherein the predicted outcome field is to store the predicted outcome or a pointer to a first in first out (FIFO) queue, the FIFO queue to store a plurality of SDD predicted outcomes associated with a respective one branch IP.

Example 17

This example includes the elements of example 11, wherein a selected record includes a first load IP field, a first store IP field, a second load IP field, a second store IP field and the predicted outcome field or a first store value field and a second store value field, the predicted outcome determined based, at least in part, on a comparison of a first store value and a second store value.

Example 18

This example includes the elements of example 11, further including erasing, by the SDD management circuitry, the predicted outcome or pop a value from a first in first out (FIFO) queue, if the baseline branch instruction is overridden.

Example 19

This example includes the elements of example 11, further including storing, by the SDD management circuitry, the at least one of the store value and/or the SDD predicted outcome in the SDD branch table if a confidence counter value is greater than or equal to a threshold.

Example 20

This example includes the elements of example 14, further including storing, by an SDD buffer, number of past instructions, the past instructions including the sequence of instructions.

Example 21

According to this example, there is provided a system. The system includes a branch prediction unit, a store direct dependent (SDD) branch prediction circuitry and an SDD management circuitry. The SDD branch prediction circuitry is to store an SDD branch table. The SDD branch table is to store at least one record. Each record includes a branch instruction pointer (IP) field, a load IP field, a store IP field, a comparison info field and at least one of a store value field and/or a predicted outcome field. The SDD management circuitry is to populate the SDD branch table at runtime and to override a baseline branch prediction associated with an incoming branch IP with an SDD branch prediction, if the SDD branch table contains a first record populated with the incoming branch IP and at least one of a store value and/or an SDD predicted outcome.

Example 22

This example includes the elements of example 21, wherein the first record is populated with a store IP and the SDD management circuitry is to determine the SDD branch prediction based, at least in part, on a store value associated with the store IP.

Example 23

This example includes the elements of example 21, wherein the populating the SDD branch table includes querying a memory renaming (MRN) circuitry using a load IP of a load instruction to determine a store IP of a store instruction, the store value associated with the store instruction.

Example 24

This example includes the elements of example 21, wherein the populating the SDD branch table includes determining a load IP based, at least in part, on a sequence of instructions preceding a SDD branch instruction, the load instruction to load a load value into a register, the load instruction related to a compare instruction that precedes the branch instruction in the sequence of instructions, the load value governing a branch outcome.

Example 25

This example includes the elements according to any one of examples 21 to 24, wherein the comparison info field is to contain one or more of a compare value, an indication whether a compare operation is between a store value and a compare value or between two store values and/or a compare condition.

Example 26

This example includes the elements according to any one of examples 21 to 24, wherein the predicted outcome field is to store the predicted outcome or a pointer to a first in first out (FIFO) queue, the FIFO queue to store a plurality of SDD predicted outcomes associated with a respective one branch IP.

Example 27

This example includes the elements according to any one of examples 21 to 24, wherein a selected record includes a first load IP field, a first store IP field, a second load IP field, a second store IP field and the predicted outcome field or a first store value field and a second store value field, the predicted outcome determined based, at least in part, on a comparison of a first store value and a second store value.

Example 28

This example includes the elements according to any one of examples 21 to 24, wherein the SDD management circuitry is to erase the predicted outcome or pop a value from a first in first out (FIFO) queue, if the baseline branch instruction is overridden.

Example 29

This example includes the elements according to any one of examples 21 to 24, wherein the SDD management circuitry is to store the at least one of the store value and/or the SDD predicted outcome in the SDD branch table if a confidence counter value is greater than or equal to a threshold.

Example 30

This example includes the elements of example 24, further including an SDD buffer to store a number of past instructions, the past instructions including the sequence of instructions.

Example 31

According to this example, there is provided a computer readable storage device. The device has stored thereon instructions that when executed by one or more processors result in the following operations including: storing a store direct dependent (SDD) branch table. The SDD branch table is to store at least one record. Each record includes a branch instruction pointer (IP) field, a load IP field, a store IP field, a comparison info field and at least one of a store value field and/or a predicted outcome field. The device further has stored thereon instructions that when executed by one or more processors result in the following operations including: populating the SDD branch table at runtime and overriding a baseline branch prediction associated with an incoming branch IP with an SDD branch prediction, if the SDD branch table contains a first record populated with the incoming branch IP and at least one of a store value and/or an SDD predicted outcome.

Example 32

This example includes the elements of example 31, wherein the first record is populated with a store IP and the instructions that when executed by one or more processors results in the following additional operations including determining the SDD branch prediction based, at least in part, on a store value associated with the store IP.

Example 33

This example includes the elements of example 31, wherein the populating the SDD branch table includes querying a memory renaming (MRN) circuitry using a load IP of a load instruction to determine a store IP of a store instruction, the store value associated with the store instruction.

Example 34

This example includes the elements of example 31, wherein the populating the SDD branch table includes determining a load IP based, at least in part, on a sequence of instructions preceding a SDD branch instruction, the load instruction to load a load value into a register, the load instruction related to a compare instruction that precedes the branch instruction in the sequence of instructions, the load value governing a branch outcome.

Example 35

This example includes the elements according to any one of examples 31 to 34, wherein the comparison info field is to contain one or more of a compare value, an indication whether a compare operation is between a store value and a compare value or between two store values and/or a compare condition.

Example 36

This example includes the elements according to any one of examples 31 to 34, wherein the predicted outcome field is to store the predicted outcome or a pointer to a first in first out (FIFO) queue, the FIFO queue to store a plurality of SDD predicted outcomes associated with a respective one branch IP.

Example 37

This example includes the elements according to any one of examples 31 to 34, wherein a selected record includes a first load IP field, a first store IP field, a second load IP field, a second store IP field and the predicted outcome field or a first store value field and a second store value field, the predicted outcome determined based, at least in part, on a comparison of a first store value and a second store value.

Example 38

This example includes the elements according to any one of examples 31 to 34, wherein the instructions that when executed by one or more processors results in the following additional operations including erasing the predicted outcome or pop a value from a first in first out (FIFO) queue, if the baseline branch instruction is overridden.

Example 39

This example includes the elements according to any one of examples 31 to 34, wherein the instructions that when executed by one or more processors results in the following additional operations including storing the at least one of the store value and/or the SDD predicted outcome in the SDD branch table if a confidence counter value is greater than or equal to a threshold.

Example 40

This example includes the elements of example 34, wherein the instructions that when executed by one or more processors results in the following additional operations including storing, by an SDD buffer, number of past instructions, the past instructions including the sequence of instructions.

Example 41

According to this example, there is provided a device. The device includes means for storing, by a store direct dependent (SDD) branch prediction circuitry, an SDD branch table. The SDD branch table is to store at least one record. Each record includes a branch instruction pointer (IP) field, a load IP field, a store IP field, a comparison info field and at least one of a store value field and/or a predicted outcome field. The device further includes means for populating, by an SDD management circuitry, the SDD branch table at runtime and means for overriding, by the SDD management circuitry, a baseline branch prediction associated with an incoming branch IP with an SDD branch prediction, if the SDD branch table contains a first record populated with the incoming branch IP and at least one of a store value and/or an SDD predicted outcome.

Example 42

This example includes the elements of example 41, wherein the first record is populated with a store IP and further including means for determining, by the SDD management circuitry, the SDD branch prediction based, at least in part, on a store value associated with the store IP.

Example 43

This example includes the elements of example 41, wherein the populating the SDD branch table includes querying a memory renaming (MRN) circuitry using a load IP of a load instruction to determine a store IP of a store instruction, the store value associated with the store instruction.

Example 44

This example includes the elements of example 41, wherein the populating the SDD branch table includes determining a load IP based, at least in part, on a sequence of instructions preceding a SDD branch instruction, the load instruction to load a load value into a register, the load instruction related to a compare instruction that precedes the branch instruction in the sequence of instructions, the load value governing a branch outcome.

Example 45

This example includes the elements according to any one of examples 41 to 44, wherein the comparison info field is to contain one or more of a compare value, an indication whether a compare operation is between a store value and a compare value or between two store values and/or a compare condition.

Example 46

This example includes the elements according to any one of examples 41 to 44, wherein the predicted outcome field is to store the predicted outcome or a pointer to a first in first out (FIFO) queue, the FIFO queue to store a plurality of SDD predicted outcomes associated with a respective one branch IP.

Example 47

This example includes the elements according to any one of examples 41 to 44, wherein a selected record includes a first load IP field, a first store IP field, a second load IP field, a second store IP field and the predicted outcome field or a first store value field and a second store value field, the predicted outcome determined based, at least in part, on a comparison of a first store value and a second store value.

Example 48

This example includes the elements according to any one of examples 41 to 44, further including means for erasing, by the SDD management circuitry, the predicted outcome or pop a value from a first in first out (FIFO) queue, if the baseline branch instruction is overridden.

Example 49

This example includes the elements according to any one of examples 41 to 44, further including means for storing, by the SDD management circuitry, the at least one of the store value and/or the SDD predicted outcome in the SDD branch table if a confidence counter value is greater than or equal to a threshold.

Example 50

This example includes the elements of example 44, further including means for storing, by an SDD buffer, number of past instructions, the past instructions including the sequence of instructions.

Example 51

According to this example, there is provided a system. The system includes at least one device arranged to perform the method of any one of examples 11 to 20.

Example 52

According to this example, there is provided a device. The device includes means to perform the method of any one of examples 11 to 20.

Example 53

According to this example, there is provided a computer readable storage device. The device has stored thereon instructions that when executed by one or more processors result in the following operations including: the method according to any one of examples 11 to 20.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus comprising:
a store direct dependent (SDD) branch prediction circuitry to store an SDD branch table, the SDD branch table to store at least one record, each record comprising a branch instruction pointer (IP) field, a load IP field, a store IP field, a comparison info field and at least one of a store value field and/or a predicted outcome field; and
an SDD management circuitry to populate the SDD branch table at runtime and to override a baseline branch prediction associated with an incoming branch IP with an SDD branch prediction, if the SDD branch table contains a first record populated with the incoming branch IP and at least one of a store value and/or an SDD predicted outcome.

2. The apparatus of claim 1, wherein the first record is populated with a store IP and the SDD management circuitry is to determine the SDD branch prediction based, at least in part, on a store value associated with the store IP.

3. The apparatus of claim 1, wherein the populating the SDD branch table comprises querying a memory renaming (MRN) circuitry using a load IP of a load instruction to determine a store IP of a store instruction, the store value associated with the store instruction.

4. The apparatus of claim 1, wherein the populating the SDD branch table comprises determining a load IP of a load instruction based, at least in part, on a sequence of instructions preceding a SDD branch instruction, the load instruction to load a load value into a register, the load instruction related to a compare instruction that precedes the branch instruction in the sequence of instructions, the load value governing a branch outcome.

5. The apparatus of claim 1, wherein the comparison info field is to contain one or more of a compare value, an indication whether a compare operation is between a store value and a compare value or between two store values and/or a compare condition.

6. The apparatus of claim 1, wherein the predicted outcome field is to store the predicted outcome or a pointer to a first in first out (FIFO) queue, the FIFO queue to store a plurality of SDD predicted outcomes associated with a respective one branch IP.

7. The apparatus of claim 1, wherein a selected record comprises a first load IP field, a first store IP field, a second load IP field, a second store IP field and the predicted outcome field or a first store value field and a second store value field, the predicted outcome determined based, at least in part, on a comparison of a first store value and a second store value.

8. The apparatus of claim 1, wherein the SDD management circuitry is to erase the predicted outcome or pop a value from a first in first out (FIFO) queue, if the baseline branch instruction is overridden.

9. A method comprising:
storing, by a store direct dependent (SDD) branch prediction circuitry, an SDD branch table, the SDD branch table to store at least one record, each record comprising a branch instruction pointer (IP) field, a load IP field, a store IP field, a comparison info field and at least one of a store value field and/or a predicted outcome field; and
populating, by an SDD management circuitry, the SDD branch table at runtime and overriding, by the SDD management circuitry, a baseline branch prediction associated with an incoming branch IP with an SDD branch prediction, if the SDD branch table contains a first record populated with the incoming branch IP and at least one of a store value and/or an SDD predicted outcome.

10. The method of claim 9, wherein the first record is populated with a store IP and further comprising determining, by the SDD management circuitry, the SDD branch prediction based, at least in part, on a store value associated with the store IP.

11. The method of claim 9, wherein the populating the SDD branch table comprises querying a memory renaming (MRN) circuitry using a load IP of a load instruction to determine a store IP of a store instruction, the store value associated with the store instruction.

12. The method of claim 9, wherein the populating the SDD branch table comprises determining a load IP based, at least in part, on a sequence of instructions preceding a SDD branch instruction, the load instruction to load a load value into a register, the load instruction related to a compare instruction that precedes the branch instruction in the sequence of instructions, the load value governing a branch outcome.

13. The method of claim 9, wherein the comparison info field is to contain one or more of a compare value, an indication whether a compare operation is between a store value and a compare value or between two store values and/or a compare condition.

14. The method of claim 9, wherein the predicted outcome field is to store the predicted outcome or a pointer to a first in first out (FIFO) queue, the FIFO queue to store a plurality of SDD predicted outcomes associated with a respective one branch IP.

15. The method of claim 9, wherein a selected record comprises a first load IP field, a first store IP field, a second load IP field, a second store IP field and the predicted outcome field or a first store value field and a second store value field, the predicted outcome determined based, at least in part, on a comparison of a first store value and a second store value.

16. The method of claim 9, further comprising erasing, by the SDD management circuitry, the predicted outcome or pop a value from a first in first out (FIFO) queue, if the baseline branch instruction is overridden.

17. A system comprising:
a branch prediction unit;
a store direct dependent (SDD) branch prediction circuitry to store an SDD branch table, the SDD branch table to store at least one record, each record comprising a branch instruction pointer (IP) field, a load IP field, a store IP field, a comparison info field and at least one of a store value field and/or a predicted outcome field; and an SDD management circuitry to populate the SDD branch table at runtime and to override a baseline branch prediction associated with an incoming branch IP with an SDD branch prediction, if the SDD branch table contains a first record populated with the incoming branch IP and at least one of a store value and/or an SDD predicted outcome.

18. The system of claim 17, wherein the first record is populated with a store IP and the SDD management circuitry is to determine the SDD branch prediction based, at least in part, on a store value associated with the store IP.

19. The system of claim 17, wherein the populating the SDD branch table comprises querying a memory renaming (MRN) circuitry using a load IP of a load instruction to determine a store IP of a store instruction, the store value associated with the store instruction.

20. The system of claim 17, wherein the populating the SDD branch table comprises determining a load IP based, at least in part, on a sequence of instructions preceding a SDD branch instruction, the load instruction to load a load value into a register, the load instruction related to a compare instruction that precedes the branch instruction in the sequence of instructions, the load value governing a branch outcome.

21. The system of claim 17, wherein the comparison info field is to contain one or more of a compare value, an indication whether a compare operation is between a store value and a compare value or between two store values and/or a compare condition.

22. The system of claim 17, wherein the predicted outcome field is to store the predicted outcome or a pointer to a first in first out (FIFO) queue, the FIFO queue to store a plurality of SDD predicted outcomes associated with a respective one branch IP.

23. The system of claim 17, wherein a selected record comprises a first load IP field, a first store IP field, a second load IP field, a second store IP field and the predicted outcome field or a first store value field and a second store value field, the predicted outcome determined based, at least in part, on a comparison of a first store value and a second store value.

24. The system of claim 17, wherein the SDD management circuitry is to erase the predicted outcome or pop a value from a first in first out (FIFO) queue, if the baseline branch instruction is overridden.

* * * * *